United States Patent
Sato et al.

(10) Patent No.: US 9,692,956 B2
(45) Date of Patent: Jun. 27, 2017

(54) IMAGING APPARATUS, COMMUNICATION DEVICE, IMAGING METHOD, AND INFORMATION NOTIFICATION METHOD

(71) Applicant: Olympus Corporation, Hachioji-shi, Tokyo (JP)

(72) Inventors: Akinobu Sato, Hachioji (JP); Keito Fukushima, Mitaka (JP); Saori Matsumoto, Hino (JP); Koji Sakai, Mitaka (JP); Yoshihiro Yokomae, Higashiyamato (JP); Hiroki Amino, Akiruno (JP); Tsuyoshi Yaji, Kawagoe (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/625,234

(22) Filed: Feb. 18, 2015

(65) Prior Publication Data
US 2015/0237249 A1 Aug. 20, 2015

(30) Foreign Application Priority Data
Feb. 20, 2014 (JP) .................................. 2014-030831

(51) Int. Cl.
*H04N 5/232* (2006.01)

(52) U.S. Cl.
CPC ..... *H04N 5/23203* (2013.01); *H04N 5/23219* (2013.01); *H04N 5/23293* (2013.01)

(58) Field of Classification Search
CPC ........... H04N 5/23203; H04N 5/23219; H04N 5/23245; H04N 5/23293; H04N 5/23206; H04N 5/44; G06K 9/0028; G06F 3/0842; H04W 76/023; H04W 76/028; H04W 8/005

See application file for complete search history.

(56) References Cited

U.S. PATENT DOCUMENTS

| 8,731,613 B2 * | 5/2014 | Tanabe .............. H04M 1/72533 348/207.1 |
| 8,749,698 B2 * | 6/2014 | Yamaya ............. H04N 5/23209 348/360 |
| 2013/0120591 A1 * | 5/2013 | Bednarczyk .......... H04W 48/18 348/207.1 |

(Continued)

FOREIGN PATENT DOCUMENTS

JP 2003-250079 9/2003

*Primary Examiner* — Luong T Nguyen
(74) *Attorney, Agent, or Firm* — John C. Pokotylo; Straub & Pokotylo

(57) ABSTRACT

An imaging apparatus includes: an imaging unit that generates image data; a feature information generation unit that generates feature information smaller in data amount than the image data, the feature information indicating features of a subject image included in an image corresponding to the image data; an imaging-side first and second communication units; a communication status determination unit that determines the status of communication between an external communication device and the imaging-side first communication unit; and an imaging-side communication control unit that transmits the feature information to the communication device via the imaging-side second communication unit when the status of communication between the communication device and the imaging-side first communication unit is not favorable.

8 Claims, 16 Drawing Sheets

(56) References Cited

U.S. PATENT DOCUMENTS

2014/0168452 A1\* 6/2014 Kim .................. H04N 1/33353
  348/207.11
2014/0179317 A1\* 6/2014 Tanaka ................. H04W 60/00
  455/435.2

\* cited by examiner

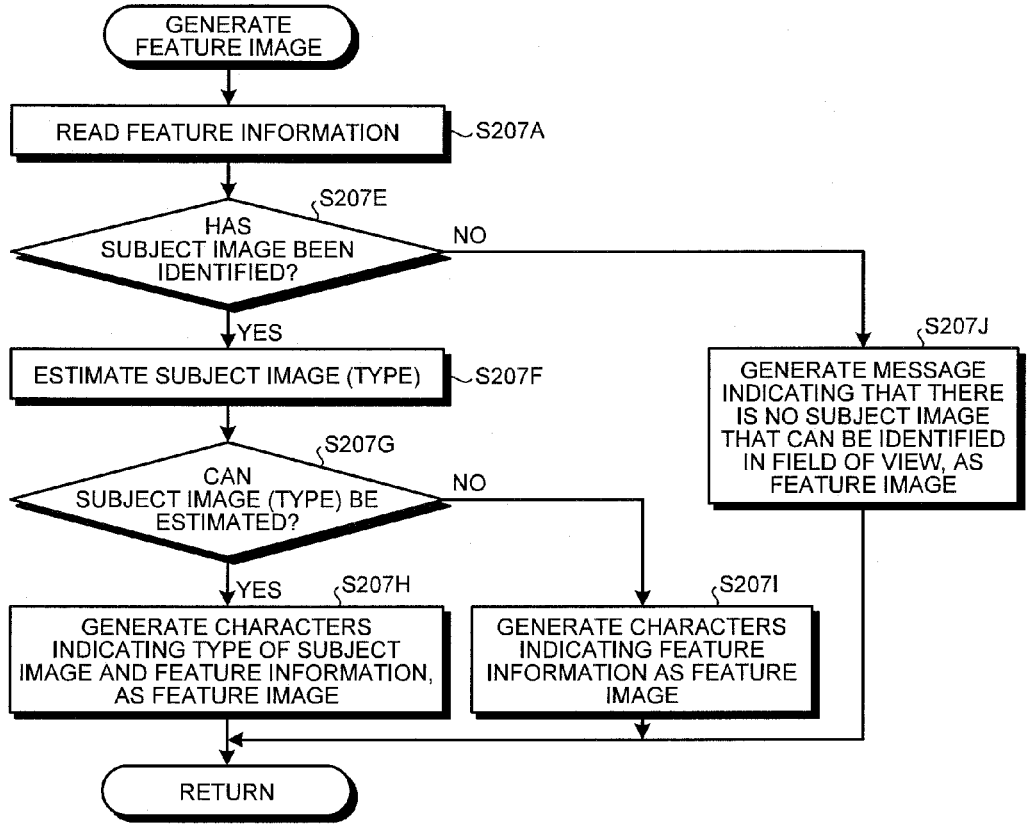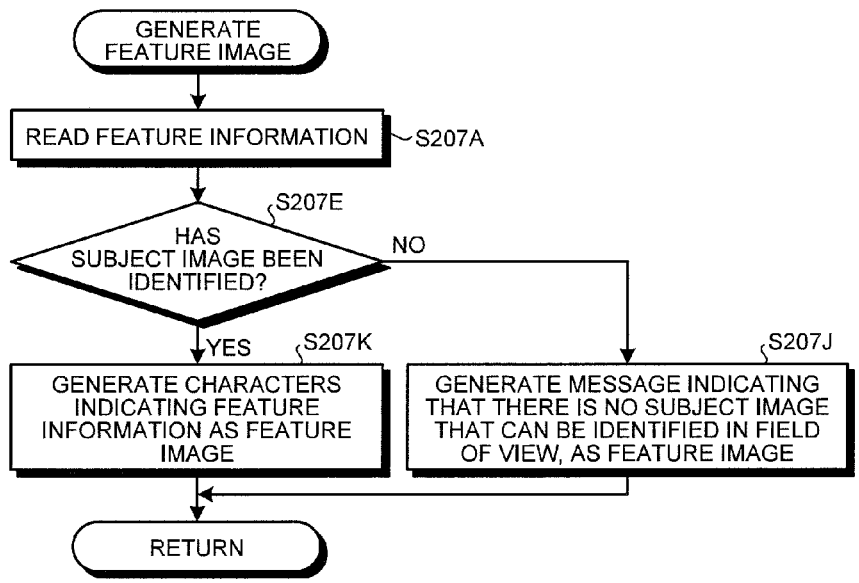

TYPE OF SUBJECT: BIRD
SIZE: ○○
POSITION: CENTER OF SCREEN
COLOR: ○○
MOVING DIRECTION: ○○
MOVING AMOUNT: ○○

THERE IS NO SUBJECT IMAGE THAT
CAN BE IDENTIFIED IN FIELD OF VIEW

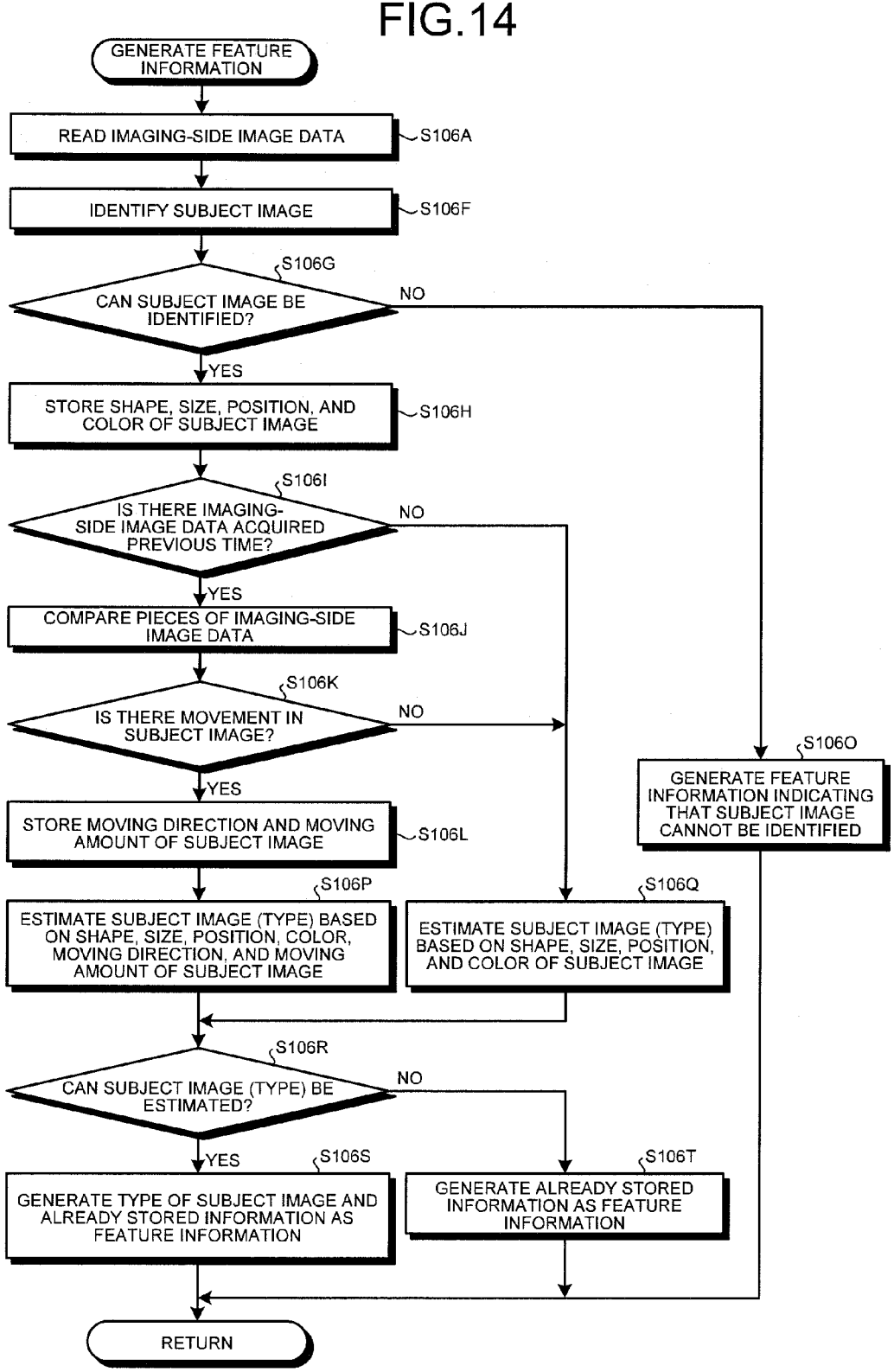

IMAGING APPARATUS, COMMUNICATION DEVICE, IMAGING METHOD, AND INFORMATION NOTIFICATION METHOD

CROSS-REFERENCE TO RELATED APPLICATION

This application claims priority to Japanese Patent Application No. 2014-030831 filed on Feb. 20, 2014, the entire contents of which are incorporated by reference herein.

BACKGROUND OF THE INVENTION

1. Field of the Invention

The present invention relates to an imaging apparatus, a communication device, an imaging method, and an information notification method.

2. Description of the Related Art

In imaging apparatuses such as digital cameras, a technology has been known in recent years which uses a communication technology to sequentially transmit image data generated by imaging to an external communication device such as a mobile phone (see, for example, Japanese Laid-open Patent Publication No. 2003-250079).

The technology is that for allowing a communication device to operate an imaging apparatus remotely.

Specifically, in the technology, the communication device sequentially receives the image data transmitted from the imaging apparatus and sequentially displays live view images corresponding to the image data on a display unit provided to the communication device. A user of the communication device executes a shooting operation on the communication device at a desired timing to cause the imaging apparatus to execute image capture while checking the live view image displayed on the display unit of the communication device. The shooting operation allows the communication device to transmit a shooting instruction to the imaging apparatus. After receiving the shooting instruction, the imaging apparatus images a subject, generates image data, and transmits the image data to the communication device.

SUMMARY OF THE INVENTION

In accordance with some embodiments, an imaging apparatus, a communication device, an imaging method, and an information notification method are presented.

In some embodiments, an imaging apparatus includes: an imaging unit that images a subject to generate image data; a feature information generation unit that generates feature information smaller in data amount than the image data, the feature information indicating features of a subject image included in an image corresponding to the image data, based on the image data; an imaging-side first communication unit that connects to an external communication device to transmit and receive information to and from the communication device; an imaging-side second communication unit that connects to the communication device to transmit and receive information to and from the communication device in a communication mode different from the communication mode of the imaging-side first communication unit; a communication status determination unit that determines whether or not the status of communication between the communication device and the imaging-side first communication unit is favorable; and an imaging-side communication control unit that transmits the feature information to the communication device via the imaging-side second communication unit when the communication status determination unit determines that the status of communication between the communication device and the imaging-side first communication unit is not favorable.

In some embodiments, a communication device for communicating with an imaging apparatus is presented. The communication device includes: a device-side communication unit that connects to the imaging apparatus to transmit and receive information to and from the imaging apparatus; a device-side communication control unit that receives feature information smaller in data amount than image data generated by the imaging apparatus, the feature information indicating features of a subject image included in an image corresponding to the image data, from the imaging apparatus via the device-side communication unit; and a notification unit that notifies information indicating the features of the subject image based on the feature information received via the device-side communication unit.

In some embodiments, an imaging method to be executed by an imaging apparatus for imaging a subject is presented. The imaging method includes: imaging a subject to generate image data; determining whether or not the status of communication between an external communication device and an imaging-side first communication unit is favorable; generating feature information smaller in data amount than the image data, the feature information indicating features of a subject image included in an image corresponding to the image data, based on the image data; and transmitting the feature information to the communication device via an imaging-side second communication unit in a communication mode different from the communication mode of the imaging-side first communication unit when the status of communication between the communication device and the imaging-side first communication unit is not favorable.

In some embodiments, an information notification method to be executed by a communication device for communicating with an imaging apparatus is presented. The information notification method includes: receiving, from the imaging apparatus, feature information smaller in data amount than image data generated by the imaging apparatus, the feature information indicating features of a subject image included in an image corresponding to the image data; and notifying information indicating the features of the subject image based on the feature information.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a flowchart illustrating the process of generating a feature image (Step S207) according to the second embodiment of the present invention.

FIG. 13A is a diagram illustrating the process of generating a feature image (Step S207) illustrated in FIG. 12.

FIG. 13B is a diagram illustrating the process of generating a feature image (Step S207) illustrated in FIG. 12.

FIG. 14 is a flowchart illustrating the process of generating feature information (Step S106) according to a third embodiment of the present invention.

FIG. 15 is a flowchart illustrating the process of generating a feature image (Step S207) according to the third embodiment of the present invention.

DETAILED DESCRIPTION OF THE PREFERRED EMBODIMENTS

Figure 1:
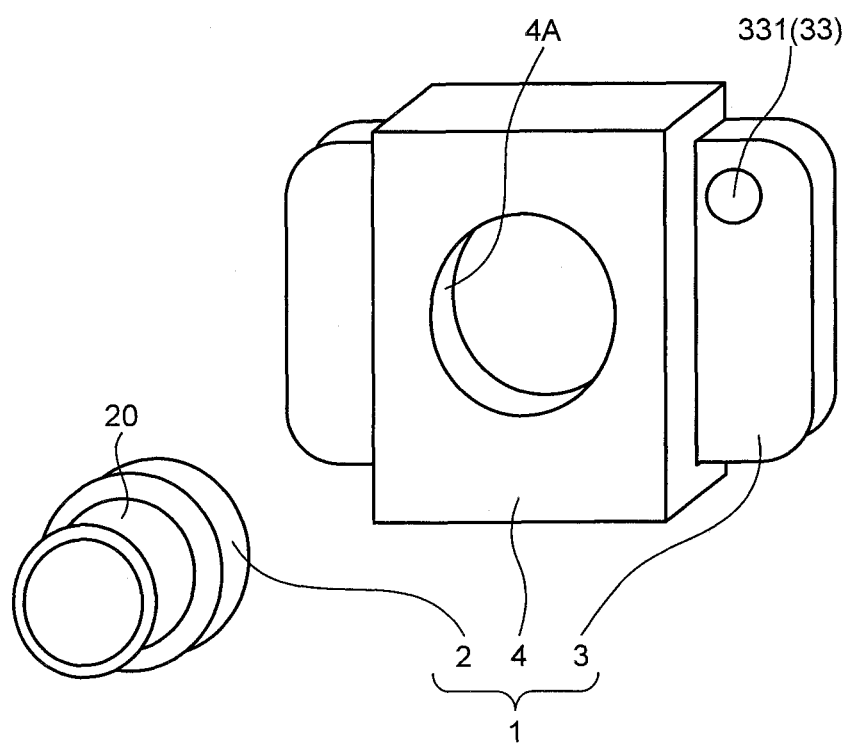
FIG. 1 is a diagram schematically illustrating the configuration of an imaging system according to a first embodiment of the present invention.

Modes for carrying out the present invention (hereinafter embodiments) are hereinafter described with reference to the accompanying drawings. The present invention is not limited by the embodiments described below. Furthermore, the same reference numerals are assigned to the same parts in the descriptions of the drawings.

First Embodiment

Schematic Configuration of Imaging System

Figure 2:
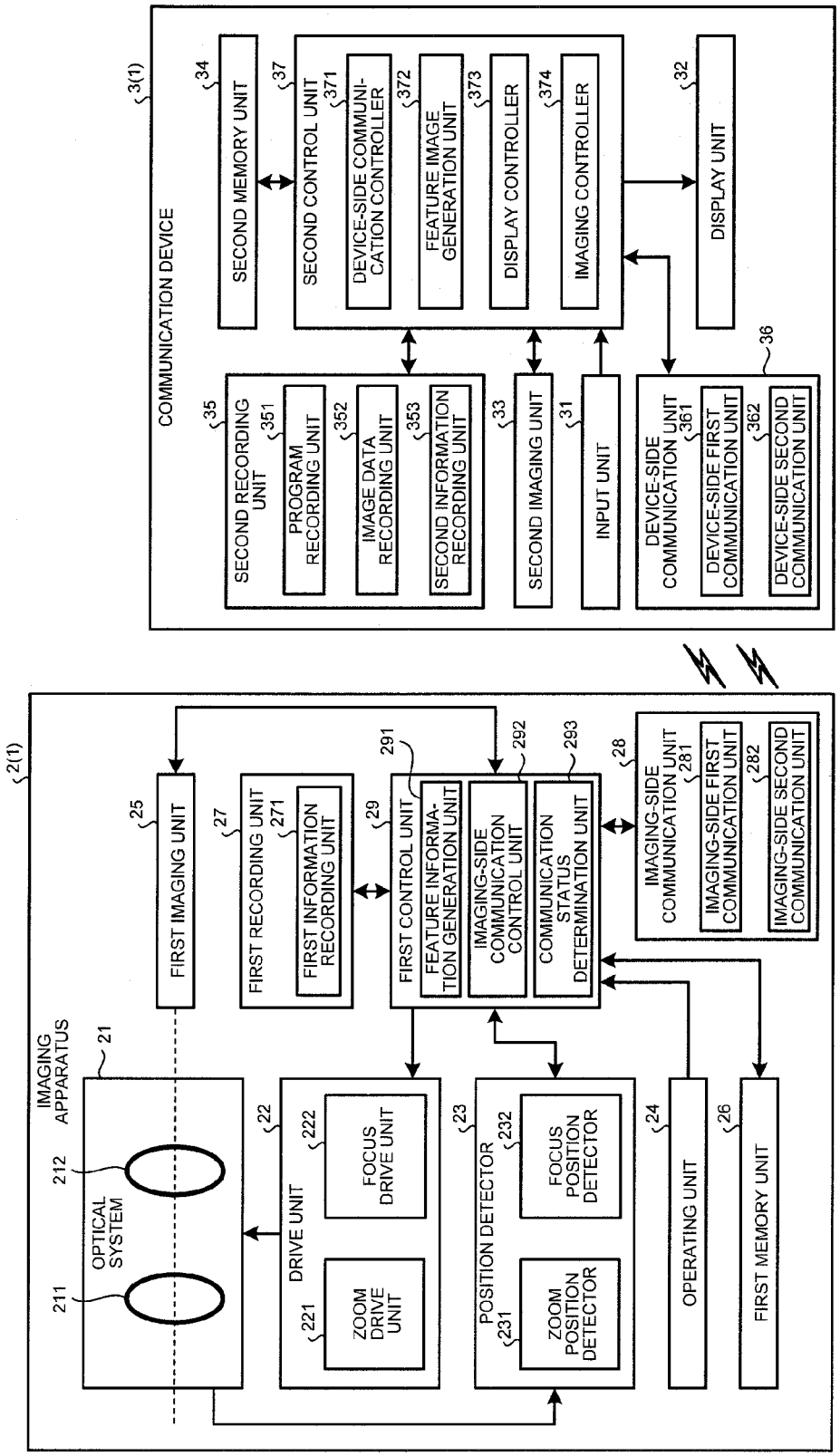
FIG. 2 is a block diagram illustrating the configuration of the imaging system illustrated in FIG. 1.

FIG. 1 is a diagram schematically illustrating the configuration of an imaging system 1 according to a first embodiment of the present invention. FIG. 2 is a block diagram illustrating the configuration of the imaging system 1.

The imaging system 1 includes an imaging apparatus 2 and a communication device 3 (FIGS. 1 and 2), which are connected by wireless communication that enables the transmission and reception of information to and from each other, and an attachment 4 (FIG. 1).

Configuration of Attachment

The attachment 4 is a member that mechanically connects the imaging apparatus 2 and the communication device 3.

More specifically, the attachment 4 is attached to the back of the communication device 3 as illustrated in FIG. 1. Moreover, the attachment 4 is provided with an attachment hole 4A having a circular shape in planar view, into which the imaging apparatus 2 is fit.

In a state where the imaging apparatus 2 and the communication device 3 are mechanically connected via the attachment 4, the entire shape of the imaging system 1 has a shape suggestive of a digital camera.

The configuration of the imaging system 1 is not limited to the one including the attachment 4. The imaging system 1 may have a configuration that omits the attachment 4.

Configuration of Imaging Apparatus

Hereinafter, major parts of the present invention are mainly described as the configuration of the imaging apparatus 2.

As illustrated in FIG. 2, the imaging apparatus 2 includes an optical system 21, a drive unit 22, a position detector 23, an operating unit 24, a first imaging unit 25, a first memory unit 26, a first recording unit 27, an imaging-side communication unit 28, and a first control unit 29. The members 21 to 29 are housed in a lens barrel 20 (FIG. 1) that as a whole has a substantially columnar shape. In other words, the entire shape of the imaging apparatus 2 has a substantially similar shape to the entire shape of what is called an interchangeable lens as illustrated in FIG. 1.

The optical system 21 collects light from a predetermined field of view, and forms an image of the collected light on an imaging surface of an imaging element (illustration omitted) configuring the first imaging unit 25. The optical system 21 includes a zoom lens 211 and a focus lens 212 as illustrated in FIG. 2.

The zoom lens 211 is configured using one or a plurality of lenses, and moves along an optical axis illustrated by a broken ling in FIG. 2 to change the zoom magnification of the optical system 21.

The focus lens 212 is configured using one or a plurality of lenses, and moves along the optical axis illustrated by the broken line in FIG. 2 to change the point of focus and focal length of the optical system 21.

The drive unit 22 moves the lenses 211 and 212 configuring the optical system 21 along the optical axis under the control of the first control unit 29. The drive unit 22 includes a zoom drive unit 221 and a focus drive unit 222 as illustrated in FIG. 2.

The zoom drive unit 221 is configured using a stepping motor, a DC motor, or the like, and moves the zoom lens 211 along the optical axis.

The focus drive unit 222 is configured using a stepping motor, a DC motor, or the like, and moves the focus lens 212 along the optical axis.

The position detector 23 detects the positions on the optical axis of the lenses 211 and 212 configuring the optical system 21. The position detector 23 includes a zoom position detector 231 and a focus position detector 232 as illustrated in FIG. 2.

The zoom position detector 231 is configured using a photointerrupter or the like, and detects the position on the optical axis of the zoom lens 211 that has been driven by the zoom drive unit 221.

Specifically, the zoom position detector 231 converts the speed of a drive motor included in the zoom drive unit 221 into the number of pulses, and detects the position on the optical axis of the zoom lens 211 from a reference position with reference to infinity, based on the converted number of pulses.

The focus position detector 232 is configured using a photointerrupter or the like, and detects the position on the optical axis of the focus lens 212 that has been driven by the focus drive unit 222 in a similar method to that of the zoom position detector 231.

The operating unit 24 is an operating ring provided to the periphery of the lens barrel 20, and a button, a switch, and the like, which are provided on the outer surface of the lens barrel 20, and accepts user operations such as an operation to change the positions on the optical axis of the zoom lens 211 and the focus lens 212 in the optical system 21, and a shooting operation. The operating unit 24 then outputs an instruction signal in accordance with the user operation to the first control unit 29.

The first imaging unit 25 images a subject and generates image data under the control of the first control unit 29. The first imaging unit 25 is configured using, for example, an imaging element such as a CCD (Charge Coupled Device) that receives the light of a subject image formed by the optical system 21 and converts it into an electrical signal, and a signal processing unit that performs signal processing (A/D conversion and the like) on the electrical signal (analog signal) from the imaging element to generate digital image data. Under the control of the first control unit 29, the image data generated by the first imaging unit 25 is then associated with time information related to a time when the image data was generated (hereinafter described as the timestamp), and sequentially stored in the first memory unit 26. Moreover, the image data generated by the first imaging unit 25 in response to a shooting operation of a user of the imaging system 1 on the imaging apparatus 2 (the operating unit 24) or the communication device 3 is stored in the first recording unit 27.

The first memory unit 26 sequentially stores the image data (including the timestamp) generated by the first imaging unit 25, and also stores feature information (including the timestamp) generated by a feature information generation unit 291 described below.

The first recording unit 27 records various programs (including an imaging program) to be executed by the first control unit 29, and property information related to the properties of the optical system 21, such as the magnification of the optical system 21, the focal length, the angle of view, aberration, and the F-number (brightness). Moreover, the first recording unit 27 records the image data generated by the first imaging unit 25 in response to a shooting operation of the user of the imaging system 1 on the imaging apparatus 2 (the operating unit 24) or the communication device 3. In FIG. 2, for convenience of description, the first recording unit 27 is configured including a first information recording unit 271. However, the first information recording unit 271 is not included in the first embodiment.

The imaging-side communication unit 28 performs wireless communication of various types of data including a signal necessary for communication with the communication device 3 in accordance with a predetermined protocol under the control of the first control unit 29. The imaging-side communication unit 28 includes an imaging-side first communication unit 281 and an imaging-side second communication unit 282 as illustrated in FIG. 2.

The imaging-side first communication unit 281 is a communication interface to perform first communication with the communication device 3. The first communication has communication path capacity that allows large amount data communication such as image data, and requires a relatively long time for the establishment of a connection.

In the first embodiment, Wi-Fi (Wireless Fidelity) (registered trademark) communication is adopted as the first communication. In addition to Wi-Fi communication, other communication, such as communication using 3G wireless, and WiMAX (Worldwide Interoperability for Microwave Access) communication, can be adopted as the first communication.

For example, in a case of Wi-Fi (registered trademark) communication, a local network is assumed. The roles of devices have a relationship between an access point and a station. A schematic connection process has a relationship where a station connects to a wireless network constructed by an access point.

A rough connection sequence goes through Steps 1 and 2: (Step 1) access points construct wireless networks, and notify their network identifiers (SSID), and (Step 2) a station searches for the notified network identifiers (SSID) and connects to a desired network (access point), in which a network with many devices is assumed. Accordingly, the coverage is wide, and it is required to go through strict identification steps considering the interference problem. Hence, it may take time to establish a connection. However, data communication can transmit and receive data at the access point's and station's own timings. Here, the imaging apparatus 2 side is considered to be the access point, and the communication device 3 to be the station. The relationship may be the other way around. Communication is possible at a speed of 10 megabits/second or more. Accordingly, an image can also be transmitted at high speeds.

The imaging-side second communication unit 282 is a communication interface to perform second communication with the communication device 3, the second communication being a communication mode different from the first communication. The second communication has communication path capacity smaller than the communication path capacity of the first communication, and can establish a connection in a relatively shorter time than the first communication.

In the first embodiment, Bluetooth (registered trademark) communication (for example, Bluetooth Low Energy) is adopted as the second communication. In addition to Bluetooth (registered trademark) communication, other communication, such as infrared communication (IrDA (Infrared Data Association), can be adopted as the second communication.

For example, in a case of Bluetooth (registered trademark), the roles of devices have a near-distance one-on-one relationship, which is a relationship between a master and a slave. As a schematic connection process, the master searches for a desired slave and establishes a connection. Accordingly, communication is established only by a relationship between an inquiry and a response, which is simple.

A rough connection sequence goes through Steps 1 to 3: (Step 1) the master makes an inquiry (Inquiry) about the existence of a slave device, (Step 2) the slaves return a response to the inquiry (Inquiry) from the master, and (Step 3) the master connects to a desired slave among the slaves that have responded. However, in terms of data communication, data is transmitted/received at the data transmission/reception instruction of the master, and data cannot be transmitted/received without the master's permission. Here, if the communication device 3 controls the imaging apparatus 2, the communication device 3 acts as the master and the imaging apparatus 2 as the slave. Accordingly, the communication device 3 can quickly acquire necessary information from the imaging apparatus 2 in response to the user's request. However, the communication speed is approximately 2 megabits/second at the maximum, and is not suitable especially for video image transfer.

The first control unit 29 is configured using a CPU (Central Processing Unit) and the like, and controls the operation of the entire imaging apparatus 2 in response to an instruction signal from the operating unit 24, or an instruction signal input from the communication device 3 via the imaging-side communication unit 28. The first control unit 29 includes a feature information generation unit 291, an imaging-side communication control unit 292, and a communication status determination unit 293 as illustrated in FIG. 2.

The feature information generation unit 291 generates feature information smaller in data amount than latest image data stored in the first memory unit 26, the feature information indicating features of a subject image included in an image corresponding to the image data, based on the image data. "Latest" indicates the most recent in time based on the timestamp (hereinafter the same shall apply). The feature information generated by the feature information generation unit 291 (including the timestamp associated with the image data used to generate the feature information) is stored in the first memory unit 26.

The imaging-side communication control unit 292 establishes communication connections by the first and second communication with the communication device 3 via the imaging-side communication unit 28. The imaging-side communication control unit 292 then transmits the property information stored in the first recording unit 27, the position information related to the positions of the zoom lens 211 and the focus lens 212 detected by the position detector 23, the latest image data (including the timestamp) stored in the first memory unit 26, the feature information (including the timestamp) generated by the feature information generation unit 291, and the like, to the communication device 3 by the first or second communication in response to the determination result by the communication status determination unit 293. Moreover, the imaging-side communication control unit 292 receives a shooting instruction and an operation instruction of the optical system 21 by the first or second communication from the communication device 3.

The communication status determination unit 293 determines whether or not the communication status by the first communication between the imaging apparatus 2 and the communication device 3 is favorable.

For example, the communication status determination unit 293 detects the signal intensity of a signal (a signal of Wi-Fi (registered trademark) in the first embodiment) transmitted by the first communication from the communication device 3. The communication status determination unit 293 then determines that the communication status by the first communication is favorable if the signal intensity is equal to or more than a predetermined threshold value. On the other hand, the communication status determination unit 293 determines that the communication status by the first communication is not favorable if the signal intensity is less than the threshold value.

Configuration of Communication Device

The communication device 3 is a device to perform wireless communication with the imaging apparatus 2, and is configured as, for example, a digital camera, digital video camera, mobile phone, or a tablet type mobile device (in FIG. 1, the communication device 3 is illustrated as a mobile phone (smartphone)).

Hereinafter, major parts of the present invention are mainly described as the configuration of the communication device 3.

As illustrated in FIG. 2, the communication device 3 includes an input unit 31, a display unit 32, a second imaging unit 33, a second memory unit 34, a second recording unit 35, a device-side communication unit 36, and a second control unit 37.

The input unit 31 is configured including a button, a switch, a touch panel, and the like that accept a user's operation, and outputs an instruction signal in response to the user's operation to the second control unit 37.

The display unit 32 is configured using a display panel formed of liquid crystals, organic EL (Electro Luminescence), or the like, and displays a predetermined image under the control of the second control unit 37.

The second imaging unit 33 is provided to the back (FIG. 1), and images a subject to generate image data under the control of the second control unit 37. The second imaging unit 33 is configured using, for example, an optical system 331 (FIG. 1) that forms a subject image, an imaging element such as a CCD that receives the light of the subject image formed by the optical system 331 and converts it into an electrical signal, and a signal processing unit that performs signal processing (A/D conversion and the like) on the electrical signal (analog signal) from the imaging element to generate digital image data.

In the following description, the image data generated by the imaging apparatus 2 (the first imaging unit 25) is described as imaging-side image data, and the image data generated by the communication device 3 (the second imaging unit 33) as device-side image data.

The second memory unit 34 stores the device-side image data generated by the second imaging unit 33, and information received from the imaging apparatus 2 via the device-side communication unit 36.

As illustrated in FIG. 2, the second recording unit 35 includes a program recording unit 351 and an image data recording unit 352. In FIG. 2, for convenience of description, the second recording unit 35 is configured including a second information recording unit 353. However, the second information recording unit 353 is not included in the first embodiment.

The program recording unit 351 records various programs (including a display program) to be executed by the second control unit 37, various types of data to be used during the execution of the programs, and the like.

The image data recording unit 352 records the imaging-side image data generated by the imaging apparatus 2, or the device-side image data generated by the second imaging unit 33, in response to a shooting operation of the user of the imaging system 1 on the input unit 31 under the control of the second control unit 37.

The device-side communication unit 36 performs wireless communication of various types of data including a signal necessary for communication with the imaging apparatus 2 in accordance with a predetermined protocol under the control of the second control unit 37. As illustrated in FIG. 2, the device-side communication unit 36 includes a device-side first communication unit 361 and a device-side second communication unit 362.

The device-side first communication unit 361 is a communication interface to perform the first communication with the imaging apparatus 2.

The device-side second communication unit 362 is a communication interface to perform the second communication with the imaging apparatus 2.

The second control unit 37 is configured using a CPU and the like, and controls the overall operation of the communication device 3 by providing corresponding instructions, or transferring data, to the units configuring the communication device 3, in response to an instruction signal from the input unit 31, and the like. As illustrated in FIG. 2, the second control unit 37 includes a device-side communication controller 371, a feature image generation unit 372, a display controller 373, and an imaging controller 374.

The device-side communication controller 371 establishes communication connections by the first and second communication with the imaging apparatus 2 via the device-side communication unit 36. The device-side communication controller 371 then receives the property information, the position information, the imaging-side image data (including the timestamp), the feature information (including the timestamp), and the like, from the imaging apparatus 2 by the first or second communication. Moreover, the device-side communication controller 371 transmits a shooting instruction to the imaging apparatus 2 by the first or second communication in response to a shooting operation of the user of the imaging system 1 on the input unit 31. Furthermore, the device-side communication controller 371 transmits an operation instruction of the optical system 21 to the imaging apparatus 2 by the first or second communication in response to the operation of the user of the imaging system 1 on the input unit 31 to operate the optical system 21 (to change the positions of the zoom lens 211 and the focus lens 212 on the optical axis).

The feature image generation unit 372 generates a feature image indicating the features of the subject image based on latest feature information stored in the second memory unit 34. The feature image (including the timestamp associated with the feature information used for the generation of the feature image) generated by the feature image generation unit 372 is then stored in the second memory unit 34.

The display controller 373 controls the operation of the display unit 32, and causes the display unit 32 to display a live view image corresponding to the imaging-side image data stored in the second memory unit 34, or the feature image stored in the second memory unit 34.

The above-mentioned display unit 32, feature image generation unit 372, and display controller 373 have a function as a notification unit according to the present invention.

If the communication device 3 is set in communication shooting mode (a mode of imaging a subject by use of the imaging apparatus 2), when the user of the imaging system 1 performs a shooting operation on the input unit 31, the imaging controller 374 transmits a shooting instruction to capture an image (the shooting instruction also including a request to transfer imaging-side image data obtained by the image capture) by the first or second communication via the device-side communication unit 36. The imaging controller 374 then records the imaging-side image data in the image data recording unit 352 if the imaging-side image data is transferred from the imaging apparatus 2.

On the other hand, if the communication device 3 is set in normal shooting mode (a mode of imaging a subject by use of the second imaging unit 33), when the user of the communication device 3 performs a shooting operation on the input unit 31, the imaging controller 374 causes the second imaging unit 33 to image a subject, and records device-side image data generated by the second imaging unit 33 in the image data recording unit 352.

Operation of Imaging System

Next, the operation of the above-mentioned imaging system 1 is described.

In the following description, it is assumed that communication connections by the first and second communication have already been established (completed) between the imaging apparatus 2 and the communication device 3. Moreover, the imaging-side image data, the feature information, and the transmission/reception of a shooting instruction are mainly described. The descriptions of the property information, the position information, and the transmission/reception of an operation instruction are omitted. Furthermore, the communication device 3 is assumed to be set in communication shooting mode.

Hereinafter, the operation of the imaging apparatus 2 and the operation of the communication device 3 are described in turn as the operation of the imaging system 1.

Operation of Imaging Apparatus

Figure 3:
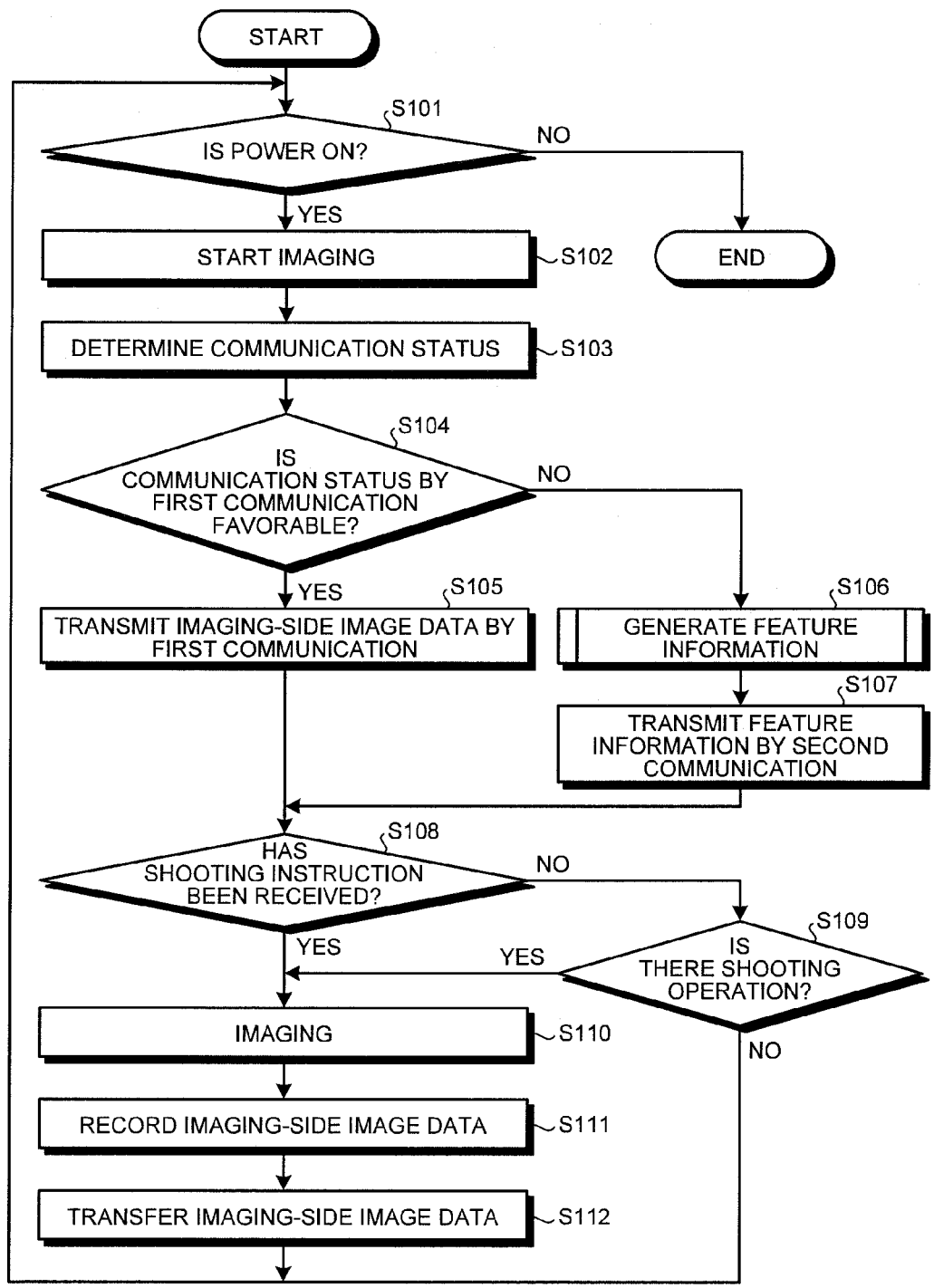
FIG. 3 is a flowchart illustrating the operation of the imaging apparatus illustrated in FIGS. 1 and 2.

FIG. 3 is a flowchart illustrating the operation (an imaging method according to the present invention) of the imaging apparatus 2.

When the user of the imaging system 1 operates the operating unit 24 and accordingly the power to the imaging apparatus 2 is turned on (Step S101: Yes), the first control unit 29 causes the first imaging unit 25 to start imaging (Step S102: an imaging step). The imaging-side image data (including the timestamp) generated by the first imaging unit 25 is sequentially stored in the first memory unit 26.

Next, the communication status determination unit 293 determines whether or not the communication status by the first communication between the imaging apparatus 2 and the communication device 3 is favorable (Step S103).

If it is determined in Step S103 that the communication status by the first communication is favorable (Step S104: Yes), the imaging-side communication control unit 292 transmits the latest imaging-side image data (including the timestamp) stored in the first memory unit 26 by the first communication to the communication device 3 via the imaging-side first communication unit 281 (Step S105).

On the other hand, if it is determined in Step S103 that the communication status by the first communication is not favorable (Step S104: No), the feature information generation unit 291 generates feature information indicating the features of a subject image included in an image corresponding to the latest imaging-side image data stored in the first memory unit 26, based on the imaging-side image data (Step S106: a feature information generation step). The feature information (including the timestamp) generated by the feature information generation unit 291 is stored in the first memory unit 26.

The process of generating feature information (Step S106) is described in detail below.

Next, the imaging-side communication control unit 292 transmits the latest feature information (including the timestamp) stored in the first memory unit 26 by the second communication to the communication device 3 via the imaging-side second communication unit 282 (Step S107: a transmission step).

After Step S105 or S107, the imaging-side communication control unit 292 judges whether or not to have received a shooting instruction from the communication device 3 by the first or second communication (Step S108).

If it is judged to have not received a shooting instruction (Step S108: No), the first control unit 29 judges whether or not the user of the imaging system 1 has performed a shooting operation of on the operating unit 24 (Step S109).

If it is judged that there has been no shooting operation (Step S109: No), the imaging apparatus 2 returns to Step S101.

If it is judged to have received a shooting instruction (Step S108: Yes), or if it is judged that there has been a shooting operation (Step S109: Yes), the first control unit 29 causes the first imaging unit 25 to image (Step S110).

Next, the first control unit 29 records the imaging-side image data (including the timestamp) generated by the imaging in the first recording unit 27 (Step S111).

Next, the imaging-side communication control unit 292 transmits (transfers) the latest imaging-side image data recorded in the first recording unit 27 by the first communication to the communication device 3 via the imaging-side first communication unit 281 (Step S112).

Here, if the communication status determination unit 293 determines that the communication status by the first communication is not favorable, the imaging-side communication control unit 292 executes Step S112 after the communication status determination unit 293 determines that the communication status by the first communication is favorable.

Process of Generating Feature Information

Next, the process of generating feature information (Step S106) is described.

Figure 4:
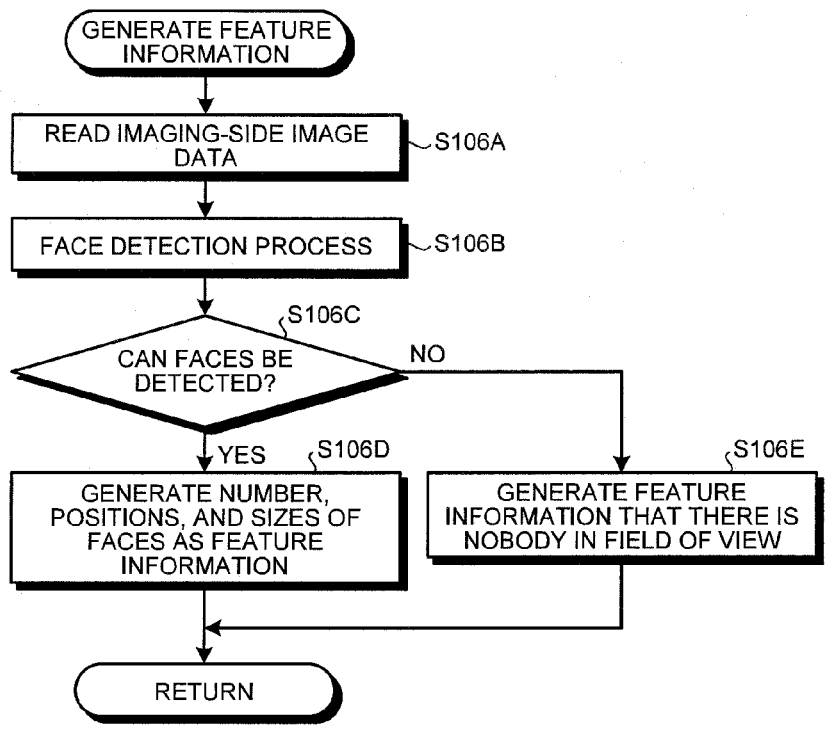
FIG. 4 is a flowchart illustrating the process of generating feature information (Step S106) illustrated in FIG. 3.
Figure 5A:
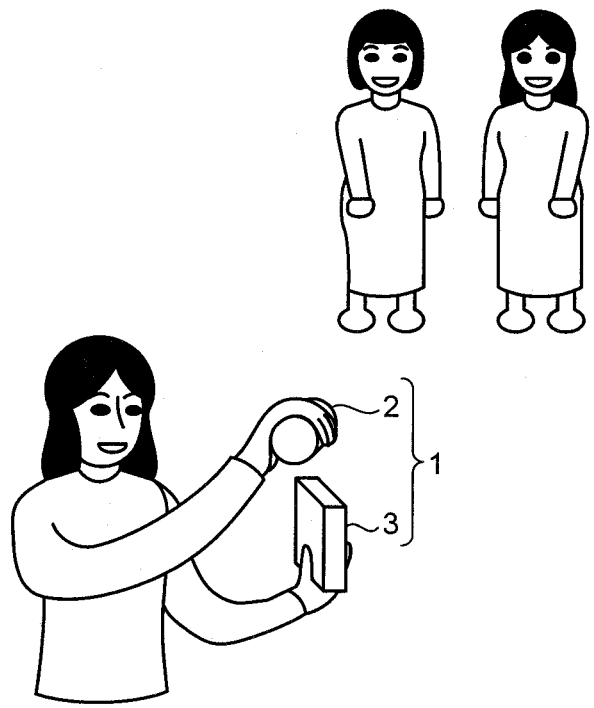
FIG. 5A is a diagram illustrating the process of generating feature information (Step S106) illustrated in FIGS. 3 and 4.
Figure 5B:
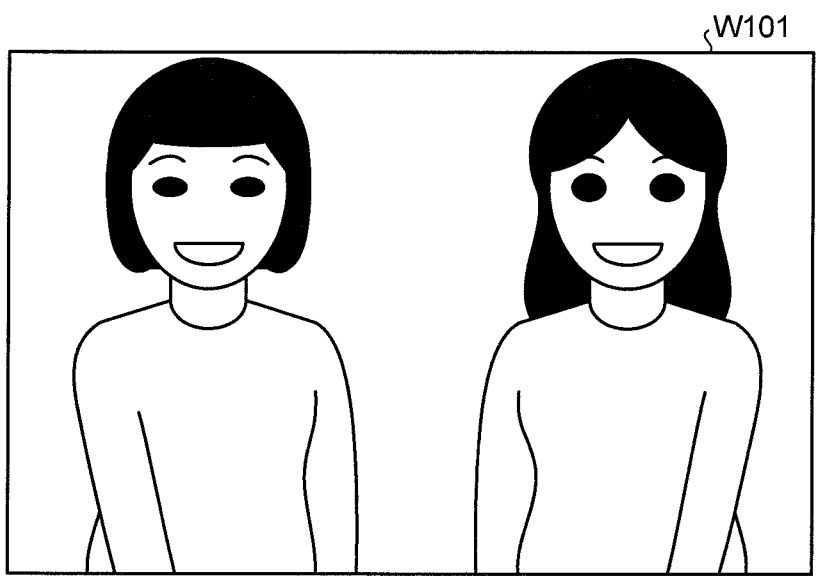
FIG. 5B is a diagram illustrating the process of generating feature information (Step S106) illustrated in FIGS. 3 and 4.

FIG. 4 is a flowchart illustrating the process of generating feature information (Step S106). FIGS. 5A and 5B are diagrams illustrating the process of generating feature information (Step S106). Specifically, FIG. 5A is a diagram illustrating an example of an aspect of using the imaging system 1 to image a subject ("two women" in FIG. 5A) while looking at a screen of the display unit 32 of the communication device 3. In FIG. 5A, the attachment 4 is not used as the imaging system 1. FIG. 5B is a diagram illustrating an image W101 imaged by the imaging apparatus 2 in the aspect of FIG. 5A.

The feature information generation unit 291 reads latest imaging-side image data stored in the first memory unit 26 (Step S106A).

Next, the feature information generation unit 291 detects the faces of the figures (subject images) included in an image corresponding to the read latest imaging-side image data by a method such as pattern matching (Step S106B).

If the faces of the figures could be detected in Step S106B (Step S106C: Yes), the feature information generation unit 291 identifies the "number ("two" in the examples of FIGS. 5A and 5B)" of faces detected in the image (the image W101 in the examples of FIGS. 5A and 5B) corresponding to the imaging-side image data, and the "positions (coordinate values)" and "sizes" of the faces in the image, and generates the identified "number", "positions", and "sizes" of the faces as the feature information (Step S106D). Naturally, more detailed information may be extracted. Information on "gender", "facial expression", and "posture", in addition to the "orientation of the face", may be extracted to be set as the feature information. Naturally, personal authentication may be performed.

On the other hand, if the faces of the figures could not be detected in Step S106B (Step S106C: No), the feature information generation unit 291 generates feature information indicating that "there is nobody in the field of view" (information indicating that features of the subject images are not included in the image corresponding to the image data) (Step S106E).

After Step S106D or S106E, the imaging apparatus 2 returns to the main routine illustrated in FIG. 3.

Here, the people's faces were described. However, a similar idea can also be applied to image determination apart from the face. For example, those that can be determined from the position and color, such as the sky and the sea, a straight line, curve, and the like, an appearance of changing contrast may be set as the feature information.

Operation of Communication Device

Next, the operation (an information notification method according to the present invention) of the communication device 3 is described.

Figure 6:
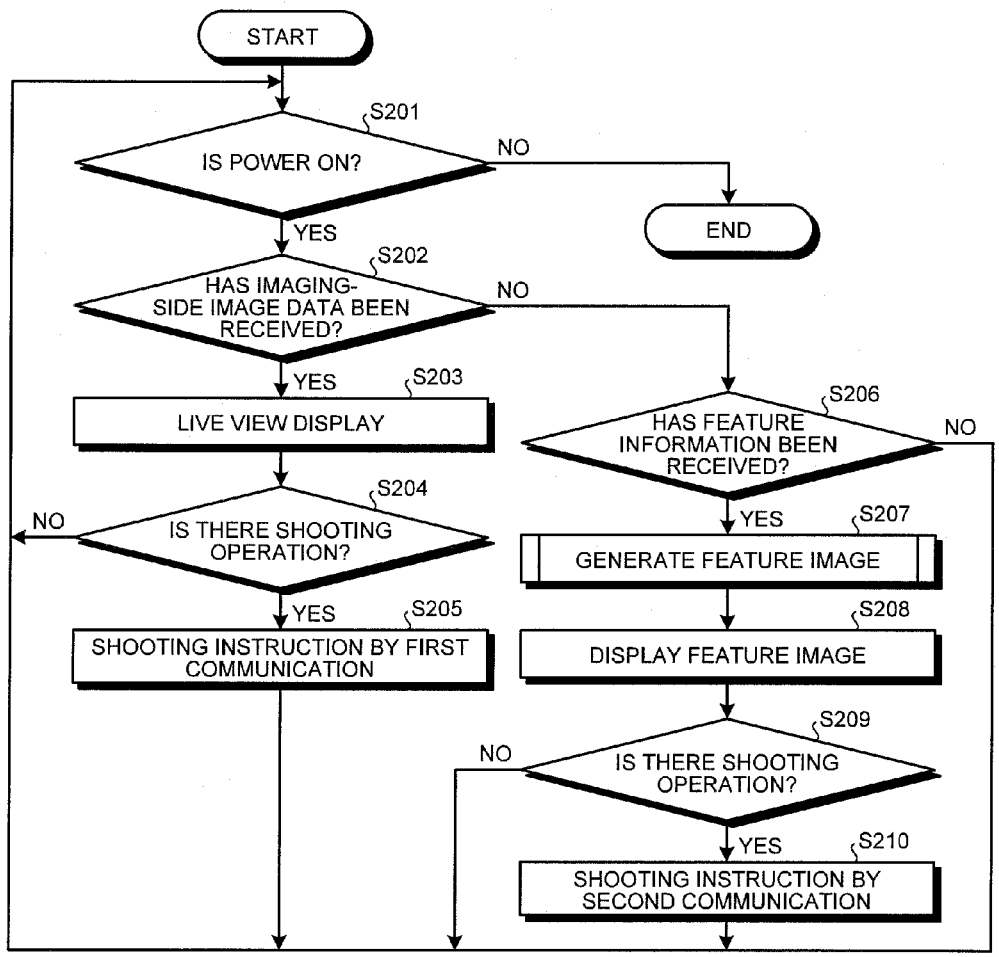
FIG. 6 is a flowchart illustrating the operation of the communication device illustrated in FIGS. 1 and 2.

FIG. 6 is a flowchart illustrating the operation of the communication device 3.

When the user of the imaging system 1 operates the input unit 31 and accordingly the power to the communication device 3 is turned on (Step S201: Yes), the device-side communication controller 371 judges whether or not to have received the imaging-side image data (including the timestamp) by the first communication from the imaging apparatus 2 via the device-side first communication unit 361 (Step S202).

If it is judged to have received the imaging-side image data (including the timestamp) (Step S202: Yes), the device-side communication controller 371 stores the received imaging-side image data (including the timestamp) in the second memory unit 34. The display controller 373 then causes the display unit 32 to display (live view display) a live view image corresponding to the latest imaging-side image data stored in the second memory unit 34 (Step S203).

Next, the imaging controller 374 judges whether or not the user of the imaging system 1 has performed a shooting operation on the input unit 31 (Step S204).

If it is judged that there has been no shooting operation (Step S204: No), the communication device 3 returns to the Step S201.

On the other hand, if it is judged that there has been a shooting operation (Step S204: Yes), the imaging controller 374 transmits a shooting instruction (also including a request to transfer imaging-side image data obtained by image capture) by the first communication to the imaging apparatus 2 via the device-side first communication unit 361 (Step S205). The communication device 3 subsequently returns to Step S201.

If it is judged to have not received the imaging-side image data (Step S202: No), the device-side communication controller 371 judges whether or not to have received the feature information (including the timestamp) by the second communication from the imaging apparatus 2 via the device-side second communication unit 362 (Step S206).

If it is judged to have not received the feature information (including the timestamp) (Step S206: No), the communication device 3 returns to Step S201.

On the other hand, if it is judged to have received the feature information (including the timestamp) (Step S206: Yes), the device-side communication controller 371 stores the received feature information (including the timestamp) in the second memory unit 34. The feature image generation unit 372 then generates a feature image indicating the features of a subject image based on the feature information (Step S207). The feature image (including the timestamp) generated by the feature image generation unit 372 is stored in the second memory unit 34.

The process of generating a feature image (Step S207) is described in detail below.

Next, the display controller 373 causes the display unit 32 to display the latest feature image stored in the second memory unit 34 (Step S208).

The above-mentioned Steps S206 to S208 correspond to a notification step according to the present invention.

Next, the imaging controller 374 judges whether or not the user of the imaging system 1 has performed a shooting operation on the input unit 31 (Step S209).

If it is judged that there has been no shooting operation (Step S209: No), the communication device 3 returns to Step S201.

On the other hand, if it is judged that there has been a shooting operation (Step S209: Yes), the imaging controller 374 transmits a shooting instruction (also including a request to transfer imaging-side image data obtained by image capture) by the second communication to the imaging apparatus 2 via the device-side second communication unit 362 (Step S210). The communication device 3 subsequently returns to Step S201.

Process of Generating Feature Image

Next, the process of generating a feature image (Step S207) is described.

Figure 7:
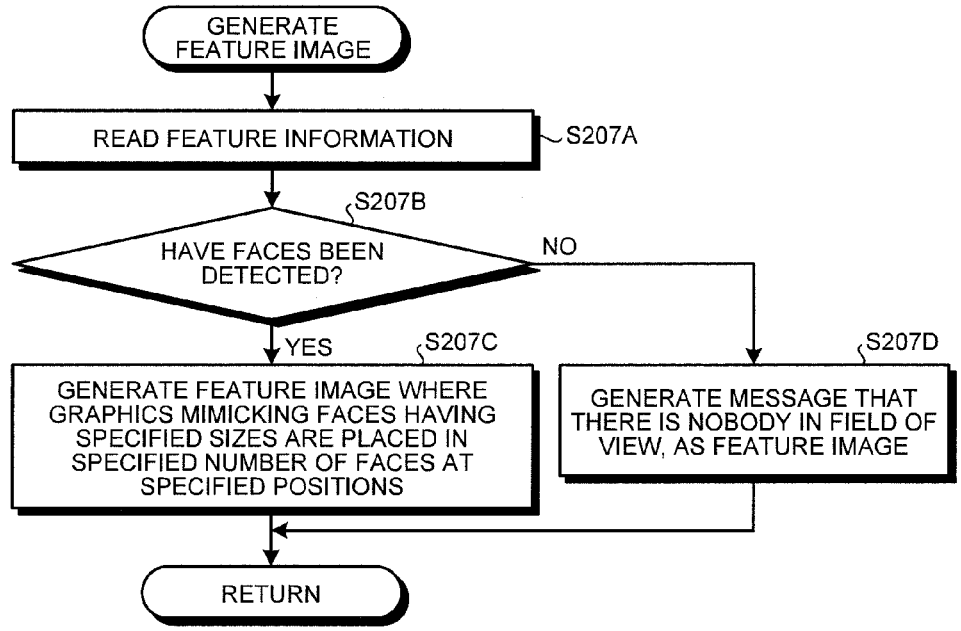
FIG. 7 is a diagram illustrating the process of generating a feature image (Step S207) illustrated in FIG. 6.
Figure 8A:
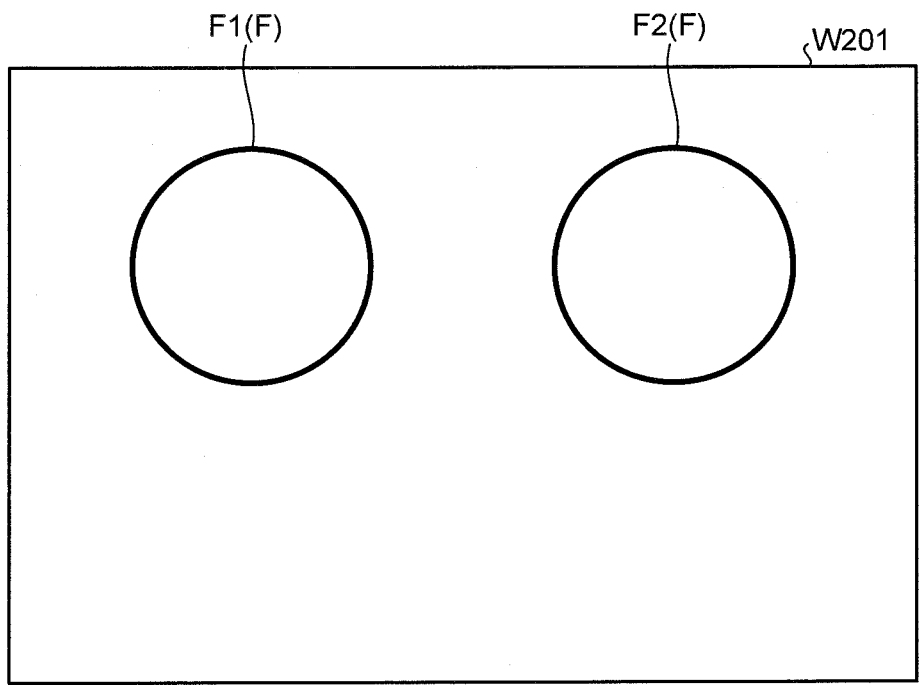
FIG. 8A is a diagram illustrating the process of generating a feature image (Step S207) illustrated in FIGS. 6 and 7.
Figure 8B:
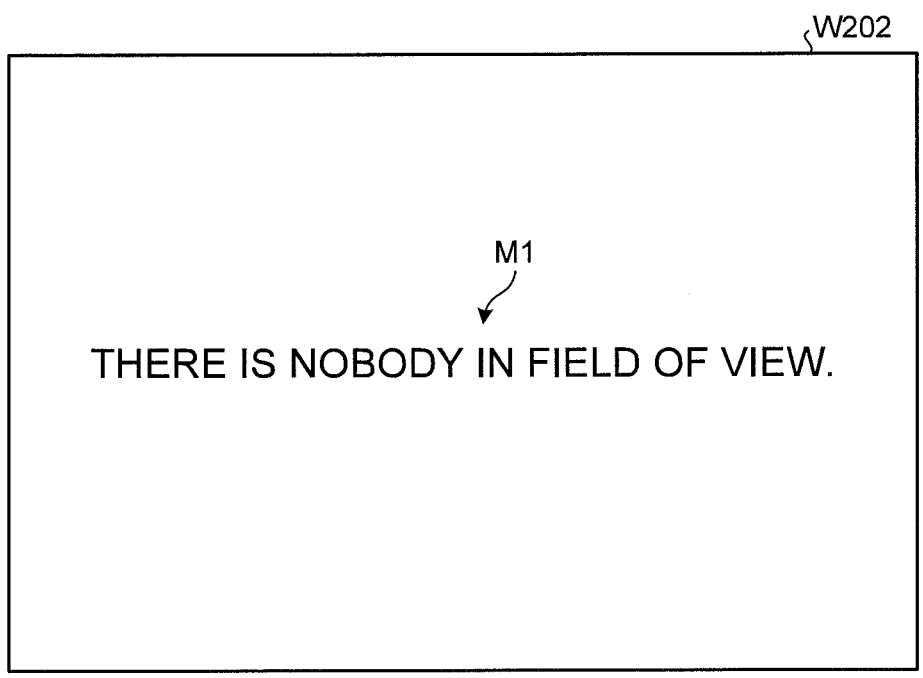
FIG. 8B is a diagram illustrating the process of generating a feature image (Step S207) illustrated in FIGS. 6 and 7.

FIG. 7 is a flowchart illustrating the process of generating a feature image (Step S207). FIGS. 8A and 8B are diagrams illustrating the process of generating a feature image (Step S207). Specifically, FIG. 8A is a diagram corresponding to FIGS. 5A and 5B, and illustrating a feature image W201 generated if the faces of the figures (subject images) have been detected in the image W101 (Step S106C: Yes). FIG. 8B is a diagram illustrating a feature image W202 generated if the faces of the figures (subject images) have not been detected (Step S106C: No).

The feature image generation unit 372 reads latest feature information stored in the second memory unit 34 (Step S207A).

Next, the feature image generation unit 372 judges whether or not the faces of the figures (subject images) have been detected in the process of generating feature information (Step S106) by the imaging apparatus 2 based on the read latest feature information (Step S207B).

If it is judged that the faces of the figures have been detected (Step S207B: Yes), the feature image generation unit 372 recognizes the feature information (the "number", "positions (coordinate values)", and "sizes" of the faces), and generates a feature image where graphics mimicking the faces having the specified sizes are placed in the specified number of faces at the specified positions (coordinate values) (Step S207C).

In the example of FIG. 8A, the feature image generation unit 372 adopts a circular graphic shape F (F1 and F2) as the graphic mimicking the face. In the examples of FIGS. 5A, 5B, and 8A, the specified number of faces is "two". Accordingly, as illustrated in FIG. 8A, the feature image generation unit 372 generates the feature image W201 where the two circular graphics F1 and F2 are placed in the specified sizes at the specified positions (coordinate values). Here, the reason why they are expressed as graphics is that it is easy to check the size, position, number, and the like intuitively. Naturally, information on gender, facial expression, and the like may be included to make an avatar-like expression. The avatar may be changed according to the result of personal authentication, or may be self-created. In this case, the identification is further facilitated. Taking pictures becomes more fun. The avatar may move and talk within a limit that does not disturb the composition to gain time during a time from the transmission to the display of the captured image. Consequently, the user can spend a waiting time for a connection of Wi-Fi (registered trademark) or the like, diverting his/her mind. In this case, in Step S208 illustrated in FIG. 6, corresponding avatars may be changed and displayed in chronological order or sequentially, as appropriate, and a plurality of images may be switched in an animated fashion, audio may be output and the display of characters may be changed. An alert or telop such as "connecting" may be presented. Naturally, in addition to the graphic expression and the avatar expression, the character expression may be offered supplementarily, which may be played back in audio supplementarily. If the display unit takes a configuration to vibrate or deform, it is also possible to judge the position of a face by touch typing. As described above, the result of determining the sky, the sea, a straight line, a curve, and the like may be displayed. For example, a display such as "there is the horizon in the center of the screen" becomes possible. Furthermore, a display such as "the horizon is tilted" is also possible adding also information of a posture sensor and the like.

On the other hand, if it is judged that the faces of the figures have not been detected (Step S207B: No), the feature image generation unit 372 generates the feature image W202 on which characters of a message M1 that "there is nobody in the field of view" (information indicating that the features of the subject image are not included in the image corresponding to the image data) are displayed as illustrated in the example of FIG. 8B (Step S207D).

After Step S207C or S207D, the communication device 3 returns to the main routine illustrated in FIG. 6.

In the imaging system 1 according to the first embodiment described above, the imaging apparatus 2 generates imaging-side image data by imaging, and generates feature information smaller in data amount than the imaging-side image data, the feature information indicating the features of a subject image included in an image corresponding to the imaging-side image data. Moreover, the imaging system 1 transmits and receives the imaging-side image data by the first communication if the communication status by the first communication between the imaging apparatus 2 and the communication device 3 is favorable, and transmits and receives the feature information by the second communication in a communication mode different from the first communication if the communication status by the first communication is not favorable. The communication device 3 then displays a live view image corresponding to imaging-side image data when having received the imaging-side image data from the imaging apparatus 2, and generates and displays a feature image indicating the features of a subject image based on feature information when having received the feature information from the imaging apparatus 2.

From the above points, the user of the imaging system 1 can grasp the field of view of the imaging apparatus 2 by checking a feature image displayed on the display unit 32 of the communication device 3 due to the transmission/reception of the feature information and the display of the feature image even if the communication status by the first communication is not favorable. In other words, even in the above-mentioned case, it produces the effects of enabling image capture by use of communication between the imaging apparatus 2 and the communication device 3, and of enabling the promotion of an improvement in convenience.

Moreover, in the first embodiment, the imaging apparatus 2 detects the faces of subject images from an image corresponding to the imaging-side image data, and generates the "number", "sizes", and "positions (coordinate values)" of the faces as the feature information. When having received the feature information from the imaging apparatus 2, the communication device 3 generates and displays a feature image (the feature image W201 in the example of FIG. 8A) where graphics (the graphics F (F1 and F2) in the example of FIG. 8A) mimicking the faces of the subjects having the sizes based on the feature information are placed in the number based on the feature information at the positions based on the feature information.

Hence, the user of the imaging system 1 can roughly set the composition for image capture by checking the feature image (the feature image W201 in the example of FIG. 8A) displayed on the display unit 32 of the communication device 3 even if the communication status by the first communication is not favorable so that a live view image cannot be checked. Therefore, an improvement in convenience can be further promoted.

Modification of First Embodiment

Figure 9:
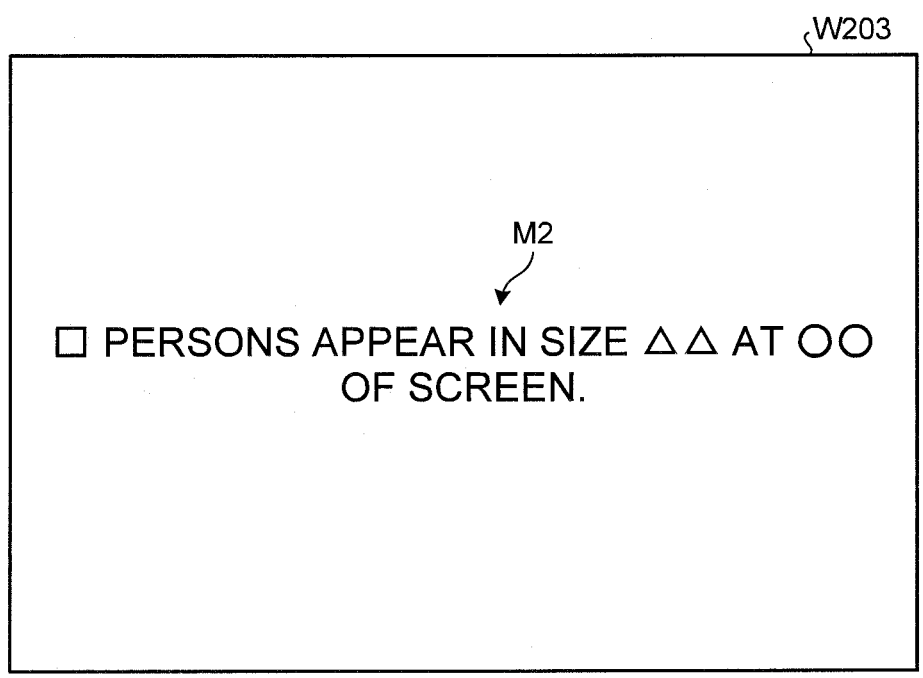
FIG. 9 is a diagram illustrating a modification of the first embodiment of the present invention.

FIG. 9 is a diagram illustrating a modification of the above-mentioned first embodiment. Specifically, FIG. 9 is a diagram illustrating a feature image W203 generated if the faces of the figures have been detected in the process of generating feature information (Step S106) (Step S106C: Yes).

In the above-mentioned first embodiment, in Step S2070, the feature image W201 is generated which expresses the "number", "positions", and "sizes" of the faces of the figures in the graphics F. However, the expression is not limited to this. As illustrated in FIG. 9, the feature image W203 may be generated which displays characters of a message M2.

Specifically, if judging that the faces of the figures have been detected (Step S207B: Yes), the feature image generation unit 372 recognizes the feature information (the number, positions (coordinate values) and sizes of the faces), and generates the feature image W203 on which the characters of the message M2 that "□ persons appear in size ΔΔ at ○○ of the screen" are displayed, as illustrated in FIG. 9. This may be played back in audio.

Also if the field of view of the imaging apparatus 2 is expressed with the characters of the message M2 (the display of the feature image W203) in this manner, the user of the imaging system 1 can roughly set the composition for image capture by checking the feature image W203.

In the above-mentioned first embodiment, the feature information generation unit 291 identifies all of the "number", "sizes", and "positions" of faces of subject images included in an image corresponding to imaging-side image data. However, the embodiment is not limited to this. At least any of the "number", "sizes", and "positions" of faces of subject images may be identified to generate at least any of the identified "number", "sizes", and "positions" of the faces of the subject images as the feature information.

Second Embodiment

Next, a second embodiment of the present invention is described.

In the following description, the same reference numerals are assigned to similar configurations and steps to the above-mentioned first embodiment. Their detailed descriptions are omitted or simplified.

An imaging system according to the second embodiment is different in the processes of generating feature information and a feature image from the imaging system 1 (FIG. 2) illustrated in the above-mentioned first embodiment.

Hereinafter, the configuration of the imaging system according to the second embodiment is described.
Configuration of Imaging System The first control unit 29 (the feature information generation unit 291) configuring the imaging apparatus 2 according to the second embodiment is changed in the function of the process of generating feature information from the first control unit 29 (the feature information generation unit 291) described in the above-mentioned first embodiment.

The second control unit 37 (the feature image generation unit 372) configuring the communication device 3 according to the second embodiment is changed in the function of the process of generating a feature image from the second control unit 37 (the feature image generation unit 372) described in the above-mentioned first embodiment.

The display unit 32, the feature image generation unit 372, and the display controller 373 have the function as the notification unit according to the present invention.

Moreover, the second information recording unit 353 is added to the second recording unit 35 configuring the communication device 3 according to the second embodiment, which is different from the second recording unit 35 described in the above-mentioned first embodiment (FIG. 2).

The second information recording unit 353 records subject image information (hereinafter described as the second subject image information) where information indicating the features of a subject image is associated according to the type among a plurality of types of subject image.

Here, the types of subject image can be illustrated by example as animals such as "persons", "dogs", "cats", and "birds", buildings such as "buildings", and landscapes such as "mountains", the "sky", and the "sea". Moreover, the information indicating the features of a subject image can be illustrated by example as the "shape", the "color", and the "moving amount (moving speed)".
Operation of Imaging System Next, the operation of the imaging system 1 according to the second embodiment is described.

Hereinafter, the operation of the imaging apparatus 2 and the operation of the communication device 3 are described in turn as the operation of the imaging system 1.
Operation of Imaging Apparatus The operation (the imaging method according to the present invention) of the imaging apparatus 2 according to the second embodiment is different only in the process of generating feature information (Step S106) from the operation (FIGS. 3 and 4) of the imaging apparatus 2 described in the above-mentioned first embodiment. Hence, only the process of generating feature information (Step S106) is hereinafter described as the operation of the imaging apparatus 2.

Figure 10:
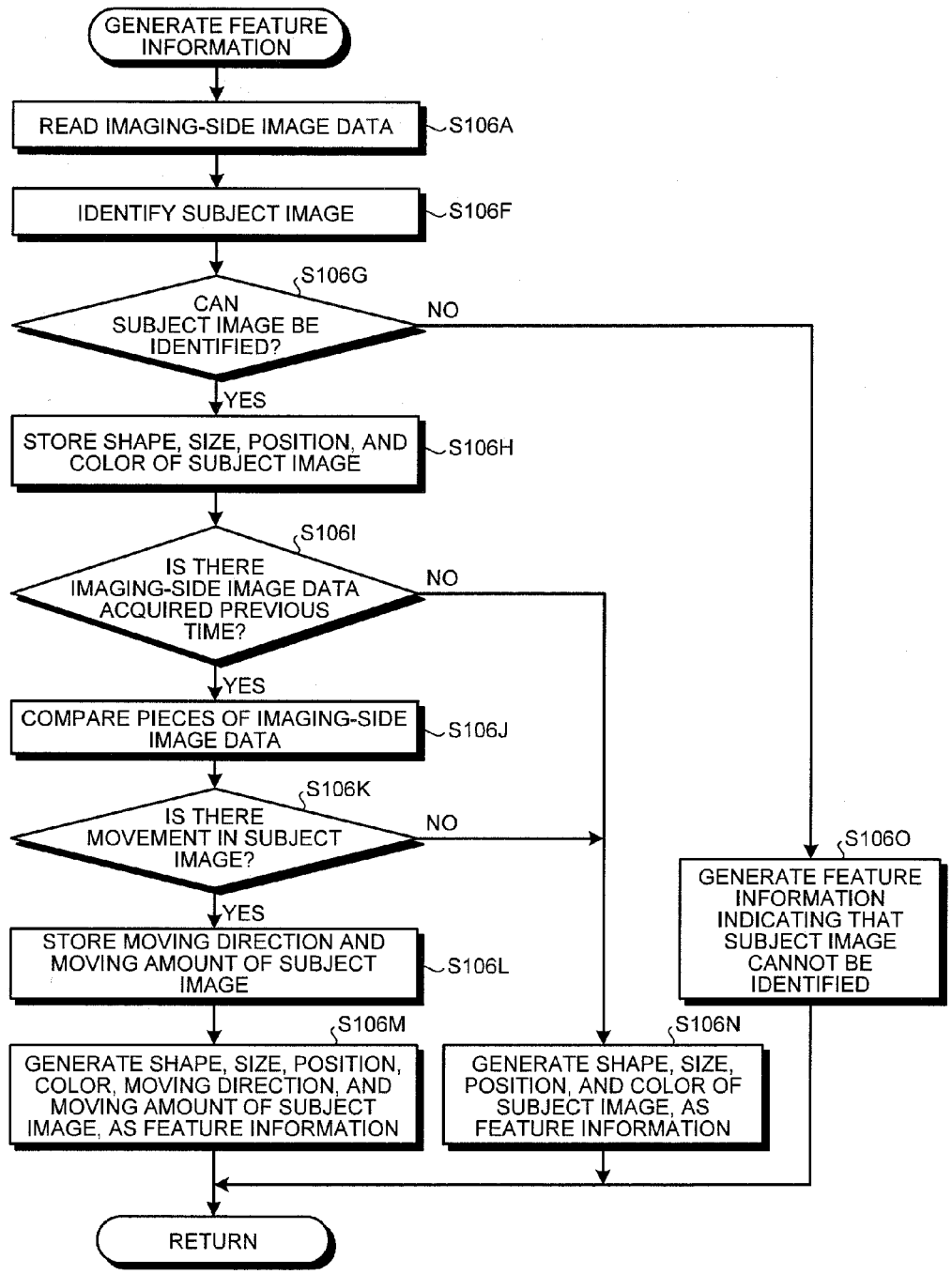
FIG. 10 is a flowchart illustrating the process of generating feature information (Step S106) according to a second embodiment of the present invention.
Figure 11A:
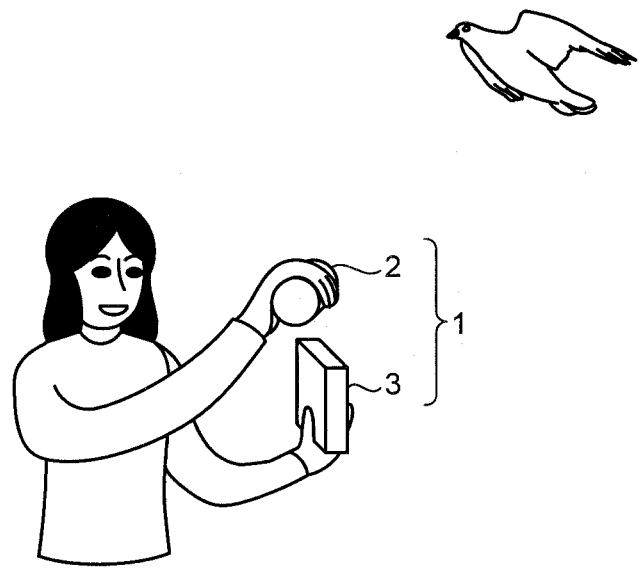
FIG. 11A is a diagram illustrating the process of generating feature information (Step S106) illustrated in FIG. 10.
Figure 11B:
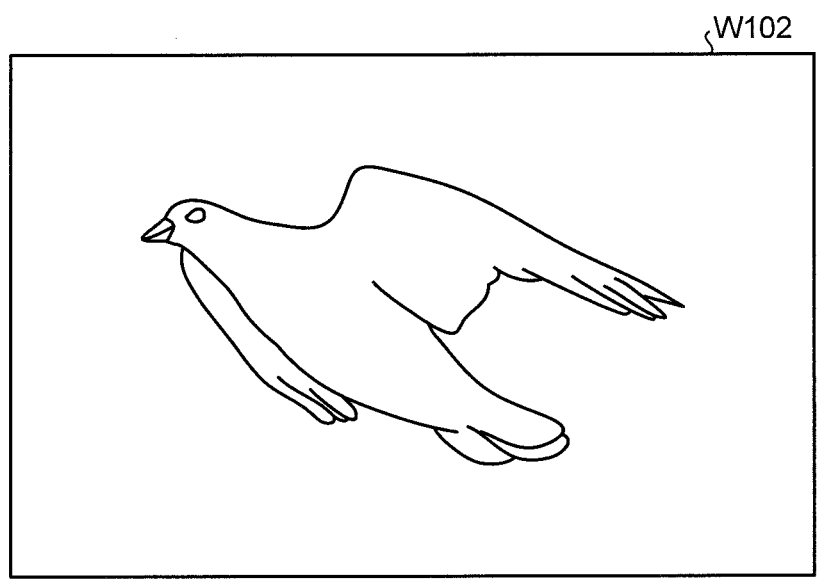
FIG. 11B is a diagram illustrating the process of generating feature information (Step S106) illustrated in FIG. 10.

FIG. 10 is a flowchart illustrating the process of generating feature information (Step S106) according to the second embodiment of the present invention. FIGS. 11A and 11B are diagrams illustrating the process of generating feature information (Step S106) according to the second embodiment of the present invention. Specifically, FIG. 11A is a diagram illustrating an example of an aspect of using the imaging system 1 to image a subject (a "bird" in FIG. 11A) while looking at the screen of the display unit 32 of the communication device 3. In FIG. 11A, the attachment 4 is not used as the imaging system 1. FIG. 11B is a diagram illustrating an image W102 imaged by the imaging apparatus 2 in the aspect of FIG. 11A.

The feature information generation unit 291 reads latest imaging-side image data stored in the first memory unit 26 as in the above-mentioned first embodiment (Step S106A).

Next, the feature information generation unit 291 identifies a subject image included in an image corresponding to the read latest imaging-side image data (Step S106F).

For example, the feature information generation unit 291 analyzes the imaging-side image data to calculate correlativity (correlativity of luminance, color difference, hue, lightness, chroma, and the like) between a pixel of interest and its surrounding pixels. The feature information generation unit 291 then extracts feature points that determine the contour of the subject image included in the image corresponding to the imaging-side image data from the correlativity, and identifies the subject image (contour) by the extraction of the feature points.

If the subject image could be identified in step S106F (Step S106G: Yes), the feature information generation unit 291 stores, in the first memory unit 26, the "shape" of the subject image (the "bird" in the examples of FIGS. 11A and 11B) identified in the image (the image W102 in the examples of FIGS. 11A and 11B) corresponding to the imaging-side image data, the "size" and "position (coordinate value)" in the image, and the "color" (Step S106H).

Next, the feature information generation unit 291 judges whether or not the imaging-side image data (the subject image has already been identified in Step S106F) acquired immediately before the latest imaging-side image data read in Step S106A is stored in the first memory unit 26 (whether or not there is the imaging-side image data acquired the previous time) (Step S106I). "Immediately before" indicates immediately before in time based on the timestamp.

If it is judged that there is not the imaging-side image data acquired the previous time (Step S106I: No), the imaging apparatus 2 shifts to Step S106N.

On the other hand, if it is judged that there is the imaging-side image data acquired the previous time (Step S106I: Yes), the feature information generation unit 291 compares the latest imaging-side image data (the subject image) with the imaging-side image data (the subject image) acquired the previous time (Step S106J).

If it is judged that there is no movement in the subject image included in the images corresponding to the pieces of the imaging-side image data as a result of the comparison of the pieces of the imaging-side image data in Step S106J (Step S106K: No), the imaging apparatus 2 shifts to Step S106N.

On the other hand, if it is judged that there is a movement in the subject image included in the images corresponding to the pieces of the imaging-side image data as a result of the comparison of the pieces of the imaging-side image data in Step S106J (Step S106K: Yes), the feature information generation unit 291 stores, in the first memory unit 26, a "moving direction (a direction from the position of the subject image in the image corresponding to the imaging-side image data acquired the previous time to the position of the subject image in the image corresponding to the latest imaging-side image data)", and a "moving amount (an inter-coordinate distance (moving speed) between the position (coordinate value) of the subject image in the image corresponding to the imaging-side image data acquired the previous time and the position (coordinate value) of the subject image in the image corresponding to the latest imaging-side image data," in the images of the subject image (Step S106L).

Next, the feature information generation unit 291 generates, as the feature information, the "shape", "size", "position", "color", "moving direction," and "moving amount (moving speed)" of the subject image stored in the first memory unit 26 in Steps S106H and S106L (Step S106M).

If it is judged that there is not the imaging-side image data acquired the previous time (Step S106I: No), or if it is judged that there is no movement in the subject image included in the images corresponding to the pieces of the imaging-side image data (Step S106K: No), the feature information generation unit 291 generates, as the feature information, the "shape", "size", "position", and "color" of the subject image stored in the first memory unit 26 in Step S106H (Step S106N).

Moreover, if the subject image could not be identified in Step S106F due to reasons such as that the contrast of the imaging-side image data is low, and that the subject image is not included in the imaging-side image data (Step S106G: No), the feature information generation unit 291 generates feature information indicating that the subject image cannot be identified (Step S106O).

After Step S106M, S106N, or S106O, the imaging apparatus 2 returns to the main routine illustrated in FIG. 3.

Operation of Communication Device

Next, the operation (the information notification method according to the present invention) of the communication device 3 according to the second embodiment is described.

The operation of the communication device 3 according to the second embodiment is different only in the process of generating a feature image (Step S207) from the operation (FIGS. 6 and 7) of the communication device 3 described in the above-mentioned first embodiment. Hence, only the process of generating a feature image (Step S207) is hereinafter described as the operation of the communication device 3.

FIG. 12 is a flowchart illustrating the process of generating a feature image (Step S207) according to the second embodiment of the present invention. FIGS. 13A and 13B are diagrams illustrating the process of generating a feature image (Step S207) according to the second embodiment of the present invention. Specifically, FIG. 13A is a diagram corresponding to FIGS. 11A and 11B, and illustrating a feature image W204 generated if the subject image has been identified in the image W102 (Step S106G: Yes). FIG. 13B is a diagram illustrating a feature image W205 generated if the subject image has not been identified (Step S106G: No).

The feature image generation unit 372 reads latest feature information stored in the second memory unit 34 as in the above-mentioned first embodiment (Step S207A).

Next, the feature image generation unit 372 judges based on the read latest feature information whether or not the subject image has been identified in the process of generating feature information (Step S106) by the imaging apparatus 2 (Step S207E).

If it is judged that the subject image has been identified (Step S207E: Yes), the feature image generation unit 372 estimates the subject image (type) matching the feature information, referring to the second subject image information recorded in the second information recording unit 353 (Step S207F).

Here, if the feature information is the "shape", "size", "position", and "color" of the subject image, the feature image generation unit 372 estimates the subject image (type) matching the "shape" and "color" of the subject image based on the feature information, referring to the second subject image information. Moreover, if the feature information is the "shape", "size", "position", "color", "moving direction", and "moving amount (moving speed)" of the subject image, the feature image generation unit 372 estimates the subject image (type) matching the "shape", "color", and "moving amount (moving speed)" of the subject image based on the feature information, referring to the second subject image information.

If the subject image (type) could be estimated in Step S207F (Step S207G: Yes), the feature image generation unit 372 generates, as the feature image, characters indicating the estimated type of subject image and the feature information (Step S207H).

In the example of FIG. 13A, the feature image generation unit 372 generates the feature image W204 where character information L is displayed in which the estimated type of subject image (the "bird" in the examples of FIGS. 11A, 11B, and 13A) and the feature information are applied to the items of the "type of subject image", "size", "position", "color", "moving direction", and "moving amount". Naturally, it is needless to say that an image can be expressed as an avatar and the like. The same applies to the case of the above-mentioned first embodiment, but the avatar information and the like are simply required to be recorded in the second recording unit 35 and the like by an information device. The avatar information and the like may be downloaded, or self-created.

If the second subject image information did not contain the subject image (type) matching the feature information so that the subject image (type) could not be estimated in Step S207F (Step S207G: No), the feature image generation unit 372 generates characters indicating the feature information as the feature image (Step S207I).

For example, the feature image generation unit 372 generates a feature image without the item of the "type of subject image" in the feature image W204 illustrated in FIG. 13A.

If it is judged that the subject image has not been identified (Step S207E: No), the feature image generation unit 372 generates the feature image W205 on which characters of a message M3 that "there is no subject image that can be identified in the field of view" is displayed, as illustrated in FIG. 13B (Step S207J).

After Step S207H, S207I, or S207J, the communication device 3 returns to the main routine illustrated in FIG. 6.

The second embodiment described above has the following effects in addition to similar effects to the above-mentioned first embodiment.

In the second embodiment, the imaging apparatus 2 identifies the "shape", "size", "color", "position", "moving direction", and "moving amount (moving speed)" of a subject image included in an image(s) corresponding to imaging-side image data, and generates, as the feature information, the identified "shape", "size", "color", "position", "moving direction", and "moving amount (moving speed)" of the subject image. When having received the feature information from the imaging apparatus 2, the communication device 3 estimates the type of subject image based on the feature information and the second subject image information, and generates and displays a feature image (the feature image W204 in the example of FIG. 13A) including the estimated type of subject image.

Hence, even if the communication status by the first communication is not favorable so that a live view image cannot be checked, the user of the imaging system 1 can grasp whether or not a subject image (the "bird" in the examples of FIGS. 11A and 11B) that the user is attempting to capture is within the field of view of the imaging apparatus 2, by checking a feature image (the feature image W204 in the example of FIG. 13A) displayed on the display unit 32 of the communication device 3. Moreover, the user of the imaging system 1 can roughly set the composition for image capture by checking the feature image (the feature image W204 in the example of FIG. 13A) including the "size", "position", and the like of the subject image, in addition to the type of subject image. Therefore, an improvement in convenience can be further promoted.

Modification of Second Embodiment

In the above-mentioned second embodiment, the imaging apparatus 2 transmits only feature information to the communication device 3 in Step S107. However, the embodiment is not limited to this. It may be configured to transmit the following additional information in addition to the feature information.

The additional information can be illustrated by example as distance information related to the distance between the imaging apparatus 2 and a subject, measured by a distance sensor provided to the imaging apparatus 2. A method for measuring the distance between the imaging apparatus 2 and the subject is not limited to the measurement method by a distance sensor. A method for calculating the distance based on imaging-side image data may be adopted. Moreover, the additional information can be illustrated by example as elevation angle information related to an angle of elevation from the imaging apparatus 2 to the subject measured by an azimuth sensor provided to the imaging apparatus 2. Furthermore, the additional information can be illustrated by example as current position information related to the current position of the imaging apparatus 2 acquired by a current position acquisition unit, provided to the imaging apparatus 2, for acquiring the current position of the imaging apparatus 2 using the GPS (Global Positioning System). Moreover, the additional information can be illustrated by example as date and time information related to the current date and time provided from a real time clock or the like provided to the imaging apparatus 2.

The communication device 3 estimates the subject image (type) based on the above-mentioned additional information in addition to the feature information in Step S207F.

In the above-mentioned second embodiment, the feature information generation unit 291 identifies all of the "shape", "size", "position", and "color" of the subject image included in the image corresponding to the imaging-side image data in Steps S106F to S106H. However, the embodiment is not limited to this. It may be configured in such a manner as that at least any of the "shape", "size", "position", and "color" of the subject image is identified, and at least any of the identified "shape", "size", "position", and "color" of the subject image is stored in the first memory unit 26. Moreover, the feature information generation unit 291 identifies all of the "moving direction" and "moving amount" of the subject image included in the images corresponding to the latest imaging-side image data and the imaging-side image data acquired the previous time, in Steps S106J to S106L. However, the embodiment is not limited to this. It may be configured in such a manner as that at least any of the "moving direction" and "moving amount" of the subject image is identified, and at least any of the identified "moving direction" and "moving amount" of the subject is stored in the first memory unit 26.

Third Embodiment

Next, a third embodiment of the present invention is described.

In the following description, the same reference numerals are assigned to similar configurations and steps to the above-mentioned first and second embodiments. Their detailed descriptions are omitted or simplified.

An imaging system according to the third embodiment is different in the processes of generating feature information and a feature image from the imaging system 1 (FIG. 2) described in the above-mentioned first embodiment.

The configuration of the imaging system according to the third embodiment is hereinafter described.

Configuration of Imaging System

The first control unit 29 (the feature information generation unit 291) configuring the imaging apparatus 2 according to the third embodiment is changed in the function of the process of generating feature information from the first control unit 29 (the feature information generation unit 291) described in the above-mentioned first embodiment.

Moreover, the first information recording unit 271 is added to the first recording unit 27 configuring the imaging apparatus 2 according to the third embodiment, which is different from the first recording unit 27 described in the above-mentioned first embodiment (FIG. 2).

The first information recording unit 271 records subject image information (hereinafter described as the first subject image information) similar to the subject image information (the second subject image information) recorded in the second information recording unit 353 described in the above-mentioned second embodiment.

The second control unit 37 (the feature image generation unit 372) configuring the communication device 3 according to the third embodiment is changed in the function of the process of generating a feature image from the second control unit 37 (the feature image generation unit 372) described in the above-mentioned first embodiment.

The display unit 32, the feature image generation unit 372, and the display controller 373 have the function as the notification unit according to the present invention.
Operation of Imaging System Next, the operation of the imaging system 1 according to the third embodiment is described.

Hereinafter, the operation of the imaging apparatus 2 and the operation of the communication device 3 are described in turn as the operation of the imaging system 1.
Operation of Imaging Apparatus The operation (the imaging method according to the present invention) of the imaging apparatus 2 according to the third embodiment is different only in the process of generating feature information (Step S106) from the operation (FIGS. 3 and 4) of the imaging apparatus described in the above-mentioned first embodiment. Hence, only the process of generating feature information (Step S106) is hereinafter described as the operation of the imaging apparatus 2.

FIG. 14 is a flowchart illustrating the process of generating feature information (Step S106) according to the third embodiment of the present invention.

As illustrated in FIG. 14, the process of generating feature information according to the third embodiment is different in a point that Steps S106M and S106N are changed to Steps S106P to S106T from the process of generating feature information (FIG. 10) described in the above-mentioned second embodiment. Hence, only Steps S106P to S106T are hereinafter described.

Step S106P is executed after Step S106L.

Specifically, the feature information generation unit 291 estimates the subject image (type) matching the "shape", "size", "position", "color", "moving direction", and "moving amount (moving speed)" of the subject image stored in the first memory unit 26 in Steps S106H and S106L, referring to the first subject image information recorded in the first information recording unit 271 as in Step S207F described in the above-mentioned second embodiment (Step S106P).

If it is judged that there is not the imaging-side image data acquired the previous time (Step S106I: No), or if it is judged that there is no movement in the subject image included in the images corresponding to the pieces of the imaging-side image data (Step S106K: No), Step S106Q is executed.

Specifically, the feature information generation unit 291 estimates the subject image (type) that matches the "shape", "size", "position", and "color" of the subject image stored in the first memory unit 26 in Step S106H, referring to the first subject image information recorded in the first information recording unit 271 as in Step S207F described in the above-mentioned second embodiment (Step S106Q).

If the subject image (type) could be estimated in Step S106P or S106Q (Step S106R: Yes), the feature information generation unit 291 generates, as the feature information, the estimated type of subject image, and the information already stored in the first memory unit 26 (Step S106S).

On the other hand, if the subject image (type) could not be estimated in Step S106P or S106Q (Step S106R: No), the feature information generation unit 291 generates, as the feature information, only the information already stored in the first memory unit 26 (Step S106T).

The above-mentioned information already stored in the first memory unit 26 is different between a case where the subject image (type) is attempted to be estimated in Step S106P and a case where the subject image (type) is attempted to be estimated in Step S106Q.

In other words, if the subject image (type) is attempted to be estimated in Step S106P, the above-mentioned information is the "shape", "size", "position", "color", "moving direction", and "moving amount (moving speed)" of the subject image stored in the first memory unit 26 in Steps S106H and S106L. On the other hand, if the subject image (type) is attempted to be estimated in Step S106Q, the above-mentioned information is the "shape", "size", "position", and "color" of the subject image stored in the first memory unit 26 in Step S106H.

After Step S106S, S106T, or S106O, the imaging apparatus 2 returns to the main routine illustrated in FIG. 3.
Operation of Communication Device Next, the operation (the information notification method according to the present invention) of the communication device 3 according to the third embodiment is described.

The operation of the communication device 3 according to the third embodiment is different only in the process of generating a feature image (Step S207) from the operation (FIGS. 6 and 7) of the communication device 3 described in the above-mentioned first embodiment. Hence, only the process of generating a feature image (Step S207) is hereinafter described as the operation of the communication device 3.

FIG. 15 is a flowchart illustrating the process of generating a feature image (Step S207) according to the third embodiment of the present invention.

As illustrated in FIG. 15, the process of generating a feature image according to the third embodiment is different in a point that Steps S207F to S207I are changed to Step S207K from the process of generating a feature image (FIG. 12) described in the above-mentioned second embodiment. Hence, only Step S207K is hereinafter described.

Step S207K is executed if it is judged that the subject image has been identified (Step S207E: Yes).

Specifically, the feature image generation unit 372 generates a feature image on which the character information L based on the feature information is displayed, as in the feature image W204 illustrated in FIG. 13A (Step S207K).

After Step S207K or 5207J, the communication device 3 returns to the main routine illustrated in FIG. 6.

As in the third embodiment described above, also if the subject image (type) is estimated on the imaging apparatus 2 side, it is possible to enjoy similar effects to the above-mentioned second embodiment.

Modification of Third Embodiment

In the above-mentioned third embodiment, the imaging apparatus 2 estimates a subject image (type) based on information such as the "shape" of the subject image in Steps S106P and S106Q. However, the embodiment is not limited to this. It may be configured to estimate the subject image (type) based on the following additional information in addition to the above information.

The additional information can be illustrated by example as distance information related to the distance between the imaging apparatus 2 and the subject image, measured by a distance sensor provided to the imaging apparatus 2. A method for measuring the distance between the imaging apparatus 2 and the subject image is not limited to the measurement method by a distance sensor. A method for calculating the distance based on imaging-side image data may be adopted. Moreover, the additional information can be illustrated by example as elevation angle information related to an angle of elevation from the imaging apparatus 2 to the subject measured by an azimuth sensor provided to the imaging apparatus 2. Furthermore, the additional information can be illustrated by example as current position information related to the current position of the imaging apparatus 2 acquired by a current position acquisition unit, provided to the imaging apparatus 2, for acquiring the current position of the imaging apparatus 2 using the GPS (Global Positioning System). Moreover, the additional information can be illustrated by example as date and time information related to the current date and time provided from a real time clock or the like provided to the imaging apparatus 2.

Fourth Embodiment

Next, a fourth embodiment of the present invention is described.

In the following description, the same reference numerals are assigned to similar configurations and steps to the above-mentioned first embodiment. Their detailed descriptions are omitted or simplified.

An imaging system according to the fourth embodiment is different in the process of generating feature information and the process of displaying an image based on the feature information from the imaging system 1 (FIG. 2) illustrated in the above-mentioned first embodiment.

Hereinafter, the configuration of the imaging system according to the fourth embodiment is described.
Configuration of Imaging System The first control unit 29 (the feature information generation unit 291) configuring the imaging apparatus 2 according to the fourth embodiment is changed in the function of the process of generating feature information from the first control unit 29 (the feature information generation unit 291) described in the above-mentioned first embodiment.

The feature image generation unit 372 is omitted from the second control unit 37 configuring the communication device 3 according to the fourth embodiment as compared to the second control unit 37 (FIG. 2) described in the above-mentioned first embodiment. With the omission of the feature image generation unit 372, the second control unit (the display controller 373) is changed in the function of the process of displaying an image based on feature information from the second control unit 37 described in the above-mentioned first embodiment.

The display unit 32 and the display controller 373 have the function as the notification unit according to the present invention.
Operation of Imaging System Next, the operation of the imaging system 1 according to the fourth embodiment is described.

Hereinafter, the operation of the imaging apparatus 2 and the operation of the communication device 3 are described in turn as the operation of the imaging system 1.
Operation of Imaging Apparatus The operation (the imaging method according to the present invention) of the imaging apparatus 2 according to the fourth embodiment is different only in the process of generating feature information (Step S106) from the operation (FIGS. 3 and 4) of the imaging apparatus described in the above-mentioned first embodiment. Hence, only the process of generating feature information (Step S106) is hereinafter described as the operation of the imaging apparatus 2.

Figure 16:
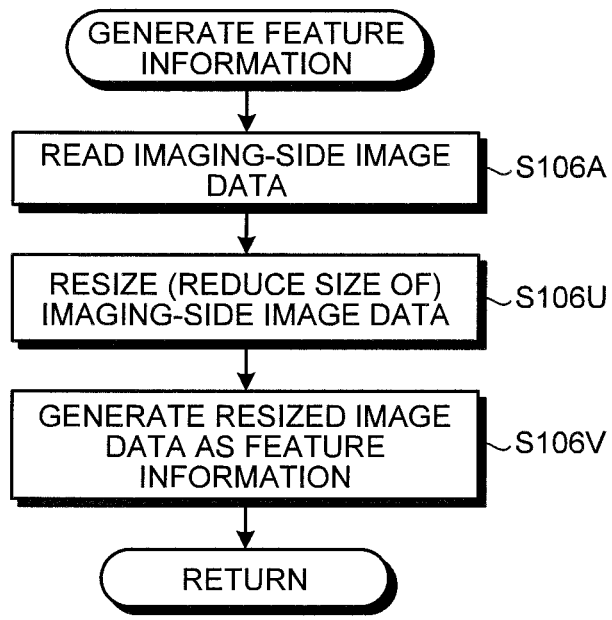
FIG. 16 is a flowchart illustrating the process of generating feature information (Step S106) according to a fourth embodiment of the present invention.

FIG. 16 is a flowchart illustrating the process of generating feature information (Step S106) according to the fourth embodiment of the present invention.

The feature information generation unit 291 reads latest imaging-side image data stored in the first memory unit 26 as in the above-mentioned first embodiment (Step S106A).

Next, the feature information generation unit 291 performs a resizing process to reduce the image size of the read latest imaging-side image data (Step S106U), and generates, as the feature information, the resized image data after the resizing process (Step S106V).

After Step S106V, the imaging apparatus 2 returns to the main routine illustrated in FIG. 3.
Operation of Communication Device Next, the operation (the information notification method according to the present invention) of the communication device 3 according to the fourth embodiment is described.

Figure 17:
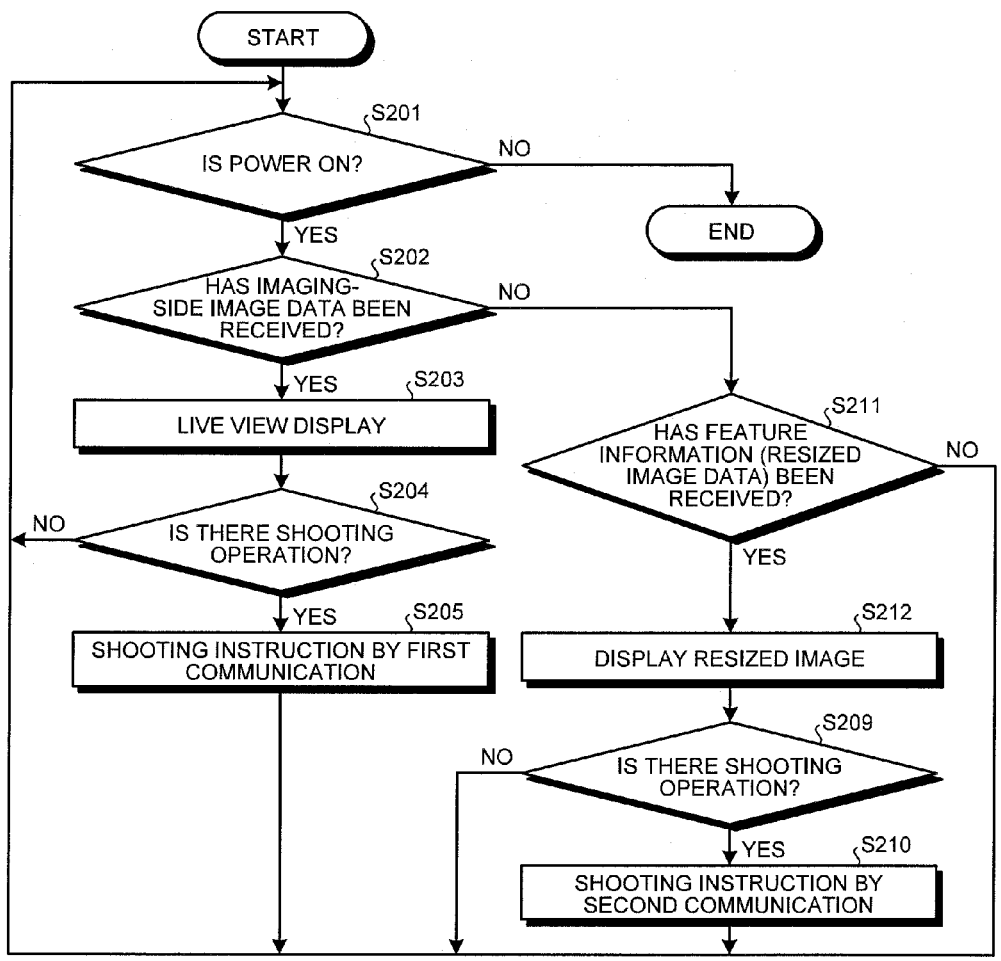
FIG. 17 is a flowchart illustrating the operation of a communication device according to the fourth embodiment of the present invention.

FIG. 17 is a flowchart illustrating the operation of the communication device 3 according to the fourth embodiment of the present invention.

As illustrated in FIG. 17, the operation of the communication device 3 according to the fourth embodiment is different only in the points that the process of generating a feature image (Step S207) is omitted and that Steps S206 and S208 are changed to Steps S211 and S212, from the operation (FIGS. 6 and 7) of the communication device 3 described in the above-mentioned first embodiment. Hence, only Steps S211 and S212 are hereinafter described as the operation of the communication device 3.

Step S211 is executed if it is judged to have not received the imaging-side image data (Step S202: No).

Specifically, the device-side communication controller 371 judges whether or not to have received the resized image data (including the timestamp) being the feature information by the second communication from the imaging apparatus 2 via the device-side second communication unit 362 (Step S211).

If it is judged to have not received the resized image data (including the timestamp) (Step S211: No), the communication device 3 returns to Step S201.

On the other hand, if it is judged to have received the resized image data (including the timestamp) (Step S211: Yes), the device-side communication controller 371 stores the received resized image data (including the timestamp) in the second memory unit 34. The display controller 373 then reads latest resized image data stored in the second memory unit 34, and causes the display unit 32 to display an image corresponding to the resized image data (Step S212).

After Step S212, the communication device 3 shifts to Step S209.

The above-mentioned Steps S211 and S212 correspond to the notification step according to the present invention.

The fourth embodiment described above has the following effects in addition to similar effects to the above-mentioned first embodiment.

In the imaging system 1 according to the fourth embodiment, the imaging apparatus 2 performs the resizing process on imaging-side image data, and generates, as the feature information, the resized image data after the resizing process. When receiving the feature information (resized image data) from the imaging apparatus 2, the communication device 3 displays an image corresponding to the resized image data.

As described above, feature information can be generated by a simple imaging process. Moreover, there is no need to generate a feature image by, for example, the analysis of the feature information. Accordingly, it is possible to promote the simplification of the configuration of the imaging system 1, and enjoy similar effects to the above-mentioned first embodiment.

Fifth Embodiment

Next, a fifth embodiment of the present invention is described.

In the following description, the same reference numerals are assigned to similar configurations and steps to the above-mentioned first embodiment. Their detailed descriptions are omitted or simplified.

An imaging system according to the fifth embodiment is different in the process of generating feature information, and the process of displaying an image based on the feature information from the imaging system 1 (FIG. 2) illustrated in the above-mentioned first embodiment.

Hereinafter, the configuration of the imaging system according to the fifth embodiment is described.
Configuration of Imaging System The first control unit 29 (the feature information generation unit 291) configuring the imaging apparatus 2 according to the fifth embodiment is changed in the function of the process of generating feature information from the first control unit 29 (the feature information generation unit 291) described in the above-mentioned first embodiment.

The feature image generation unit 372 is omitted from the second control unit 37 configuring the communication device 3 according to the fifth embodiment as compared to the second control unit 37 (FIG. 2) described in the above-mentioned first embodiment. With the omission of the feature image generation unit 372, the second control unit 37 (the display controller 373) is changed in the function of the process of displaying an image based on feature information from the second control unit 37 (the display controller 373) described in the above-mentioned first embodiment.

The display unit 32 and the display controller 373 have the function as the notification unit according to the present invention.
Operation of Imaging System Next, the operation of the imaging system 1 according to the fifth embodiment is described.

Hereinafter, the operation of the imaging apparatus 2 and the operation of the communication device 3 are described in turn as the operation of the imaging system 1.
Operation of Imaging Apparatus The operation (the imaging method according to the present invention) of the imaging apparatus 2 according to the fifth embodiment is different only in the process of generating feature information (Step S106) from the operation (FIGS. 3 and 4) of the imaging apparatus 2 described in the above-mentioned first embodiment. Hence, only the process of generating feature information (Step S106) is hereinafter described as the operation of the imaging apparatus 2.

Figure 18:
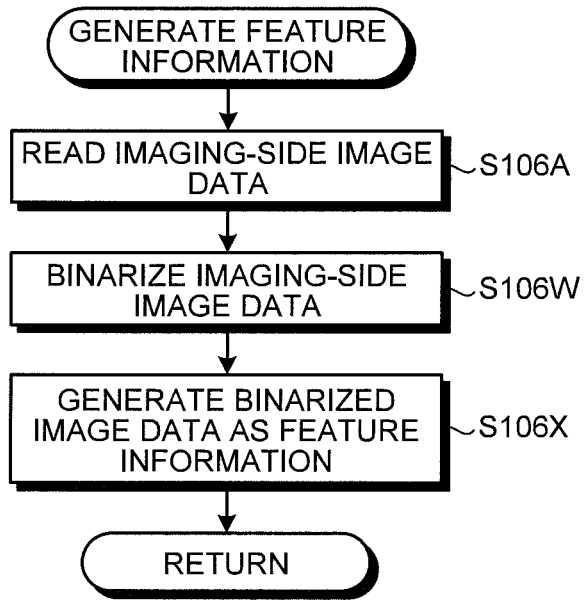
FIG. 18 is a flowchart illustrating the process of generating feature information (Step S106) according to a fifth embodiment of the present invention.

FIG. 18 is a flowchart illustrating the process of generating feature information (Step S106) according to the fifth embodiment of the present invention.

The feature information generation unit 291 reads latest imaging-side image data stored in the first memory unit 26 as in the above-mentioned first embodiment (Step S106A).

Next, the feature information generation unit 291 binarizes pixel values of the read latest imaging-side image data (Step S106W), and generates, as the feature information, the binarized image data after the binary conversion (Step S106X).

After Step S106X, the imaging apparatus 2 returns to the main routine illustrated in FIG. 3.
Operation of Communication Device Next, the operation (the information notification method according to the present invention) of the communication device 3 according to the fifth embodiment is described.

Figure 19:
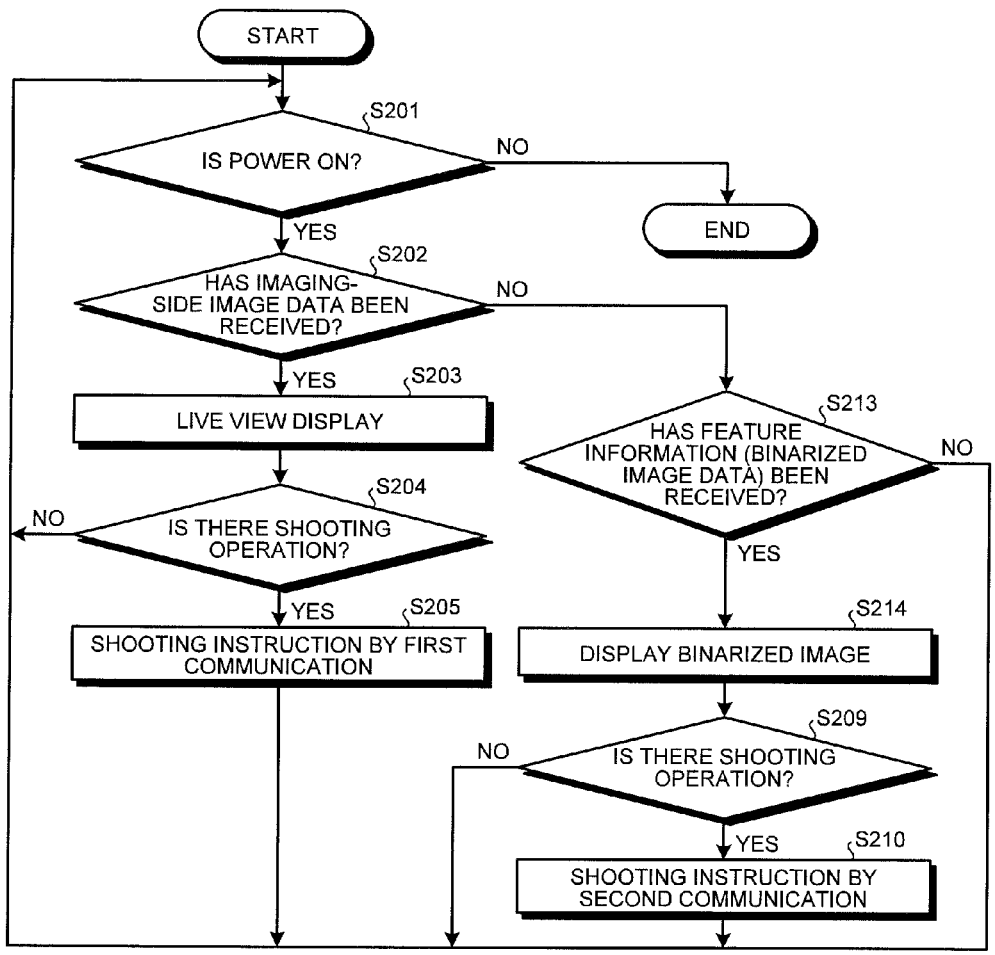
FIG. 19 is a flowchart illustrating the operation of a communication device according to the fifth embodiment of the present invention.

FIG. 19 is a flowchart illustrating the operation of the communication device 3 according to the fifth embodiment of the present invention.

As illustrated in FIG. 19, the operation of the communication device 3 according to the fifth embodiment is different only in the points that the process of generating a feature image (Step S207) is omitted and that Steps S206 and S208 are changed to Steps S213 and S214, from the operation (FIGS. 6 and 7) of the communication device 3 described in the above-mentioned first embodiment. Hence, only Steps S213 and S214 are hereinafter described as the operation of the communication device 3.

Step S213 is executed if it is judged to have not received the imaging-side image data (Step S202: No).

Specifically, the device-side communication controller 371 judges whether or not to have received the binarized image data (including the timestamp) being the feature information by the second communication from the imaging apparatus 2 via the device-side second communication unit 362 (Step S213).

If it is judged to have not received the binarized image data (including the timestamp) (Step S213: No), the communication device 3 returns to Step S201.

On the other hand, if it is judged to have received the binarized image data (including the timestamp) (Step S213: Yes), the device-side communication controller 371 stores the received binarized image data (including the timestamp) in the second memory unit 34. The display controller 373 then reads latest binarized image data stored in the second memory unit 34, and causes the display unit 32 to display an image corresponding to the binarized image data (Step S214).

After Step S214, the communication device 3 shifts to Step S209.

The above-mentioned Steps S213 and S214 correspond to the notification step according to the present invention.

The fifth embodiment described above has the following effects in addition to similar effects to the above-mentioned first embodiment.

In the imaging system 1 according to the fifth embodiment, the imaging apparatus 2 binarizes pixel values of imaging-side image data, and generates, as the feature information, the binarized image data after the binary conversion. When having received the feature information (binarized image data) from the imaging apparatus 2, the communication device 3 displays an image corresponding to the binarized image data.

As described above, feature information can be generated by a simple imaging process. There is no need to generate a feature image by, for example, the analysis of the feature information. Accordingly, it is possible to promote the simplification of the configuration of the imaging system 1, and enjoy similar effects to the above-mentioned first embodiment.

Other Embodiments

Up to this point, the modes for carrying out the present invention have been described. However, the present invention should not be limited only by the above-mentioned first to fifth embodiments.

In the above-mentioned first to fifth embodiments, a lens-style camera having a substantially similar entire shape to the entire shape of what is called an interchangeable lens is illustrated as the imaging apparatus 2. However, the imaging apparatus 2 is not limited to this, but may be configured of a normal digital camera (regardless of the presence or absence of a display unit).

In the above-mentioned first to fifth embodiments, the feature information is transmitted by the second communication if the communication status by the first communication is not favorable (Step S107). However, the embodiment is not limited to this. It may be configured to transmit feature information by the first communication since the data amount of the feature information is relatively smaller than imaging-side image data. Moreover, it may be configured to always transmit feature information by the first communication, regardless of whether or not the communication status by the first communication is favorable. In this case, a communication interface for the second communication may be omitted in the imaging system 1.

In the above-mentioned first to fifth embodiments, feature information is generated (Step S106) and transmitted (Step S107) if the communication status by the first communication is not favorable. However, the embodiment is not limited to this. For example, it may be configured in such a manner as that the communication status determination unit 293 determines whether or not a communication connection by the first communication has been established and, if the communication connection by the first communication has not been established (completed), establishes a communication connection by the second communication, and executes Steps S106 and S107.

In the above-mentioned first to fifth embodiments, the communication device 3 generates and displays a feature image based on feature information. However, the embodiment is not limited to this. It may be configured to notify the audio indicating the features of a subject image based on the feature information.

The configurations described in the above-mentioned first to fifth embodiments may be combined as appropriate. For example, it may be configured in such a manner as that the configurations described in the first and fourth embodiments are combined, and the imaging apparatus generates and transmits, as the feature information, the "number", "sizes", and "positions" of faces of subject images, and resized image data. At this point in time, the communication device is to display a feature image indicating the above-mentioned "number", "sizes", and "positions" of faces of the subject images, and an image corresponding to the resized image data.

Moreover, the processing flows are not limited to the sequences of processes in the flowcharts described in the above-mentioned first to fifth embodiments, and may be changed within the range that does not cause a contradiction.

Furthermore, the algorithms of the processes described using the flowcharts in the description can be described as programs. Such programs may be recorded in a recording unit inside a computer, or may be recorded in a computer-readable recording medium. The recording of the programs in the recording unit or recording medium may be performed upon shipment of the computer or recording medium as a product, or may be performed by download via a communication network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit that images a subject to generate image data;
a feature information generation unit that generates feature information smaller in data amount than the image data, the feature information indicating features of a subject image included in an image corresponding to the image data, based on the image data;
an imaging-side first communication unit that connects to an external communication device to transmit and receive the image data to and from the external communication device;
an imaging-side second communication unit that connects to the external communication device to transmit and receive the feature information to and from the external communication device in a communication mode different from the communication mode of the imaging-side first communication unit;
a communication status determination unit that determines whether or not the status of communication between the external communication device and the imaging-side first communication unit is favorable; and
an imaging-side communication control unit that transmits the feature information to the external communication device via the imaging-side second communication unit when the communication status determination unit determines that the status of communication between the external communication device and the imaging-side first communication unit is not favorable.

2. The imaging apparatus according to claim 1, wherein the feature information generation unit identifies at least one of the number, sizes, and positions of faces of subject images included in the image corresponding to the image data, and the feature information is information indicating the at least one of the identified number, sizes, and positions of faces.

3. The imaging apparatus according to claim 1, wherein the feature information generation unit identifies at least one of the shape, size, color, and position of the subject image included in the image corresponding to the image data, and the feature information is information indicating the at least one of the identified shape, size, color, and position.

4. The imaging apparatus according to claim 1, wherein the feature information generation unit identifies at least one of the moving direction and moving amount of the subject image included in images corresponding to image data of a previous image chronologically preceding the image, and image data of a next image chronologically following the image generated by the imaging unit, and the feature information is information indicating the at least one of the identified moving direction and moving amount.

5. The imaging apparatus according to claim 1, further comprising a first information recording unit that records first subject image information in which the type of the subject image and information indicating the features of the subject image are associated with each other, wherein the feature information generation unit estimates the type of the subject image included in the image corresponding to the image data based on the image data and the first subject image information, and generates the feature information including the estimated type of the subject image.

6. The imaging apparatus according to claim 1, wherein the imaging-side communication control unit transmits the image data to the external communication device via the imaging-side first communication unit when the communication status determination unit determines that the status of communication between the external communication device and the imaging-side first communication unit is favorable.

7. The imaging apparatus according to claim 1, wherein the feature information is information indicating that the image corresponding to the image data does not include the features of the subject image when the feature information generation unit fails to detect the features of the subject image included in the image corresponding to the image data.

8. The imaging apparatus according to claim 1, wherein the external communication device includes:
   a device-side first communication unit that connects to the imaging-side first communication unit to transmit and receive information to and from the imaging-side first communication unit; and
   a device-side second communication unit that connects to the imaging-side second communication unit to transmit and receive information to and from the imaging-side second communication unit in a communication mode different from the communication mode of the device-side first communication unit, wherein
   the capacity of a communication path between the imaging-side first communication unit and the device-side first communication unit has a communication path capacity that enables the transmission/reception of the image data, and
   the capacity of a communication path between the imaging-side second communication unit and the device-side second communication unit has a communication path capacity smaller than the capacity of the communication path between the imaging-side first communication unit and the device-side first communication unit.

* * * * *